US012811736B2

(12) United States Patent
Fahim et al.

(10) Patent No.: US 12,811,736 B2
(45) Date of Patent: Nov. 24, 2026

(54) CARRIER AGGREGATION AT AMBIENT INTERNET OF THINGS (IOT) DEVICES THROUGH DOUBLE SIDEBAND BACKSCATTERING

(71) Applicant: QUALCOMM Incorporated, San Diego, CA (US)

(72) Inventors: Mohammad Tarek Fahim, San Diego, CA (US); Srinivas Yerramalli, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 18/364,787

(22) Filed: Aug. 3, 2023

(65) Prior Publication Data

US 2025/0047433 A1 Feb. 6, 2025

(51) Int. Cl.
*H04W 72/04* (2023.01)
*H04L 5/00* (2006.01)
*H04W 76/00* (2018.01)
*H04W 88/08* (2009.01)

(52) U.S. Cl.
CPC .......... *H04L 5/0048* (2013.01); *H04L 5/0094* (2013.01)

(58) Field of Classification Search
None
See application file for complete search history.

(56) References Cited

U.S. PATENT DOCUMENTS

2024/0163840 A1* 5/2024 Säily ...................... G01S 7/006

FOREIGN PATENT DOCUMENTS

CN 119316927 A * 1/2025 .......... H04L 5/0048
WO WO-2021031919 A1 * 2/2021 .......... H04W 72/20
WO 2022200673 A1 9/2022

OTHER PUBLICATIONS

James (A 1.0-Mb/s 198-pJ/bit Bluetooth Low-Energy Compatible Single Sideband Backscatter Uplink for the NeuroDisc Brain-Computer Interface, Oct. 2019). (Year: 2019).*
Liao et al. (Ambient FSK Backscatter Communications using LTE Cell Specific Reference Signals, Jan. 2023) (Year: 2023).*
Yang et al. (Multi-antenna Wireless Energy Transfer for Backscatter Communication Systems, 2015). (Year: 2015).*
International Search Report and Written Opinion—PCT/US2024/032566—ISA/EPO—Oct. 11, 2024.

* cited by examiner

*Primary Examiner* — Maharishi V Khirodhar
(74) *Attorney, Agent, or Firm* — Muncy, Geissler, Olds & Lowe, P.C.

(57) ABSTRACT

Disclosed are techniques for wireless communication. In an aspect, a communication device may receive a reference signal from a communication station, wherein the reference signal is based on a reference component carrier. The communication device may generate one or more control signals based on one or more keying signals, the one or more keying signals having respective one or more keying frequencies. The communication device may transmit a backscattered signal based on the reference signal and the one or more control signals, wherein the backscattered signal is based on one or more pairs of component carriers that correspond to the reference component carrier shifted by the one or more keying frequencies.

30 Claims, 18 Drawing Sheets

CARRIER AGGREGATION AT AMBIENT INTERNET OF THINGS (IOT) DEVICES THROUGH DOUBLE SIDEBAND BACKSCATTERING

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a communication device includes receiving a reference signal from a communication station, wherein the reference signal is based on a reference component carrier; generating one or more control signals based on one or more keying signals, the one or more keying signals having respective one or more keying frequencies; and transmitting a backscattered signal based on the reference signal and the one or more control signals, wherein the backscattered signal is based on one or more pairs of component carriers that correspond to the reference component carrier shifted by the one or more keying frequencies.

In an aspect, a method of operating a communication station includes transmitting a reference signal to a communication device, wherein the reference signal is based on a reference component carrier; receiving a backscattered signal from the communication device, wherein the backscattered signal is based on one or more pairs of component carriers that correspond to the reference component carrier shifted by one or more keying frequencies of one or more keying signals; and engaging in a positioning procedure based on the backscattered signal.

In an aspect, a communication device includes one or more memories; one or more transceivers; and one or more processors communicatively coupled to the one or more memories and the one or more transceivers, the one or more processors, either alone or in combination, configured to: receive, via the one or more transceivers, a reference signal from a communication station, wherein the reference signal is based on a reference component carrier; generate one or more control signals based on one or more keying signals, the one or more keying signals having respective one or more keying frequencies; and transmit, via the one or more transceivers, a backscattered signal based on the reference signal and the one or more control signals, wherein the backscattered signal is based on one or more pairs of component carriers that correspond to the reference component carrier shifted by the one or more keying frequencies.

In an aspect, a communication station includes one or more memories; one or more transceivers; and one or more processors communicatively coupled to the one or more memories and the one or more transceivers, the one or more processors, either alone or in combination, configured to: transmit, via the one or more transceivers, a reference signal to a communication device, wherein the reference signal is based on a reference component carrier; receive, via the one or more transceivers, a backscattered signal from the communication device, wherein the backscattered signal is based on one or more pairs of component carriers that correspond to the reference component carrier shifted by one or more keying frequencies of one or more keying signals; and engage in a positioning procedure based on the backscattered signal.

In an aspect, a communication device includes means for receiving a reference signal from a communication station, wherein the reference signal is based on a reference component carrier; means for generating one or more control signals based on one or more keying signals, the one or more keying signals having respective one or more keying frequencies; and means for transmitting a backscattered signal based on the reference signal and the one or more control signals, wherein the backscattered signal is based on one or more pairs of component carriers that correspond to the reference component carrier shifted by the one or more keying frequencies.

In an aspect, a communication station includes means for transmitting a reference signal to a communication device, wherein the reference signal is based on a reference component carrier; means for receiving a backscattered signal from the communication device, wherein the backscattered signal is based on one or more pairs of component carriers that correspond to the reference component carrier shifted by one or more keying frequencies of one or more keying signals; and means for engaging in a positioning procedure based on the backscattered signal.

In an aspect, a non-transitory computer-readable medium stores computer-executable instructions that, when executed by a communication device, cause the communication device to: receive a reference signal from a communication station, wherein the reference signal is based on a reference component carrier; generate one or more control signals based on one or more keying signals, the one or more keying signals having respective one or more keying frequencies; and transmit a backscattered signal based on the reference signal and the one or more control signals, wherein the backscattered signal is based on one or more pairs of component carriers that correspond to the reference component carrier shifted by the one or more keying frequencies.

In an aspect, a non-transitory computer-readable medium stores computer-executable instructions that, when executed by a communication station, cause the communication station to: transmit a reference signal to a communication device, wherein the reference signal is based on a reference component carrier; receive a backscattered signal from the communication device, wherein the backscattered signal is based on one or more pairs of component carriers that correspond to the reference component carrier shifted by one or more keying frequencies of one or more keying signals; and engage in a positioning procedure based on the backscattered signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
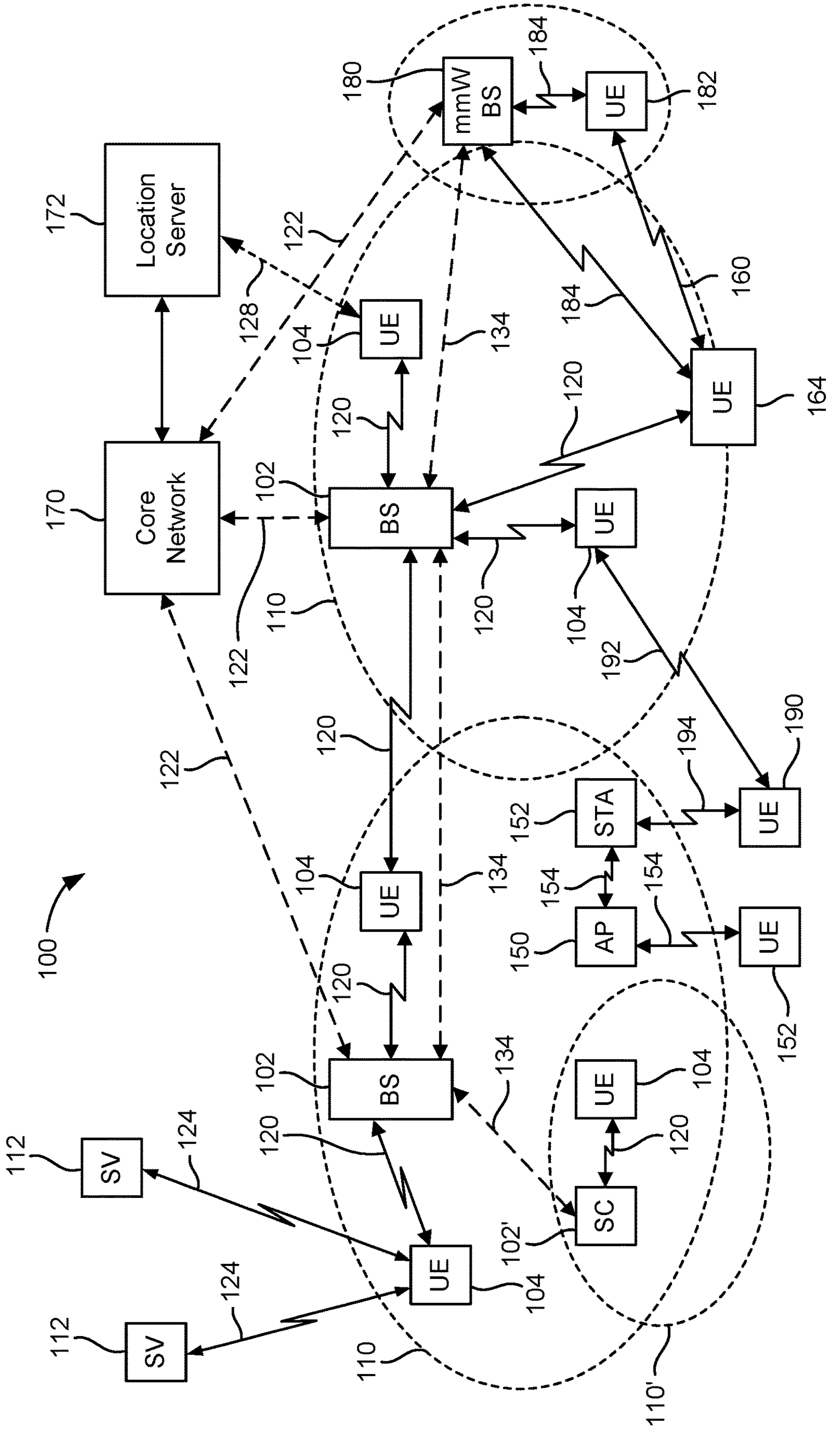
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to carrier aggregation at an ambient Internet of Things (IoT) device in order to transmit a backscattered signal based on double-sideband (DSB) frequency shifting. Some aspects more specifically relate to expanding the number of component carriers based on DSB shifting the incoming reference signal performed by the ambient IoT device.

Particular aspects of the subject matter described in this disclosure can be implemented to realize one or more of the following potential advantages. In some examples, by adjusting an impedance of an antenna of the ambient IoT device based on one or more keying signals, the described techniques can be used to transmit the backscattered signal based on one or more pairs of component carriers created by DSB frequency shifting of the reference component carrier of the reference signal. Accordingly, less resources for positioning at the transmitter side may be allocated, while the bandwidth of the backscattered signal may be expanded for increased positioning accuracy.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions.

A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
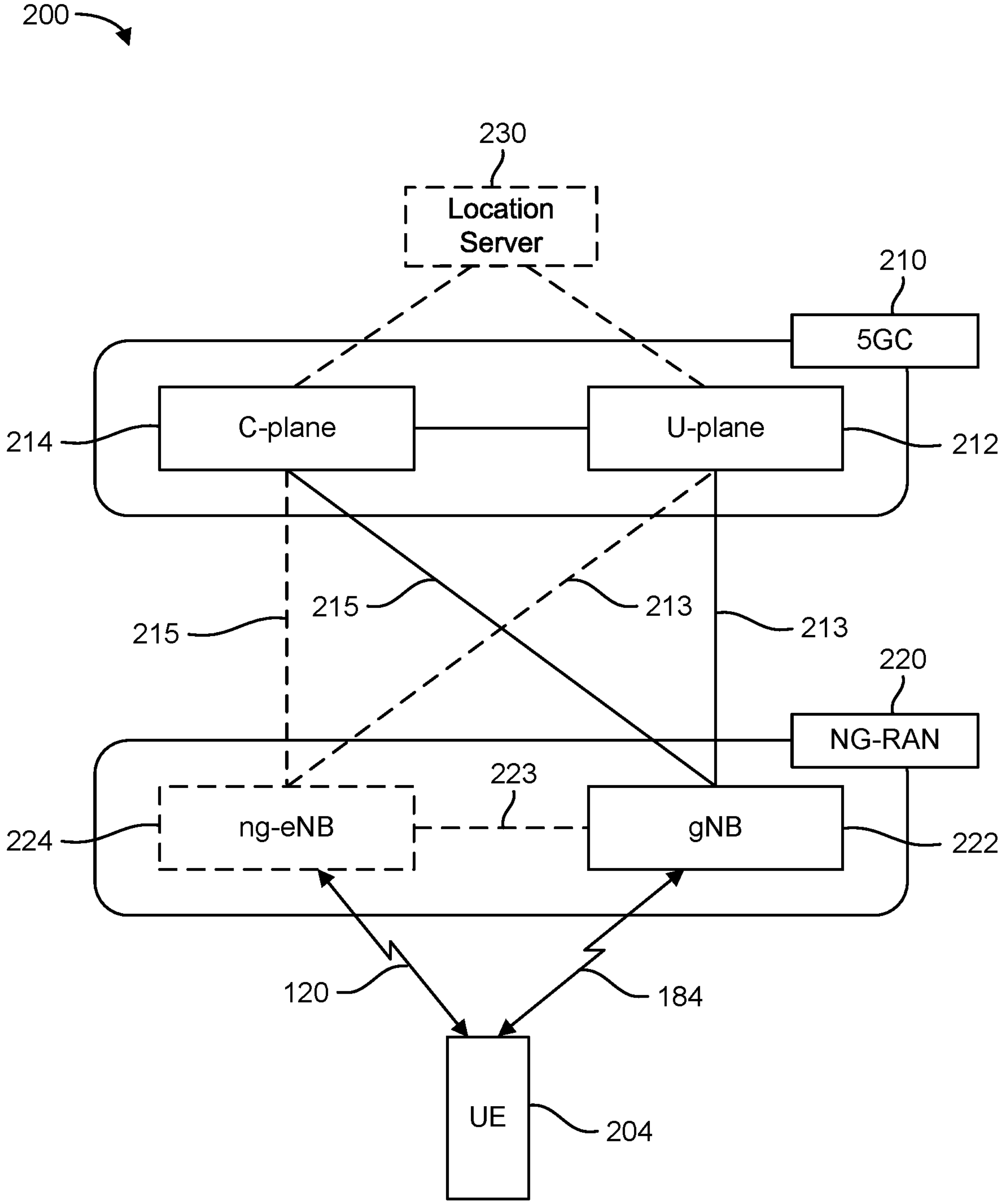
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
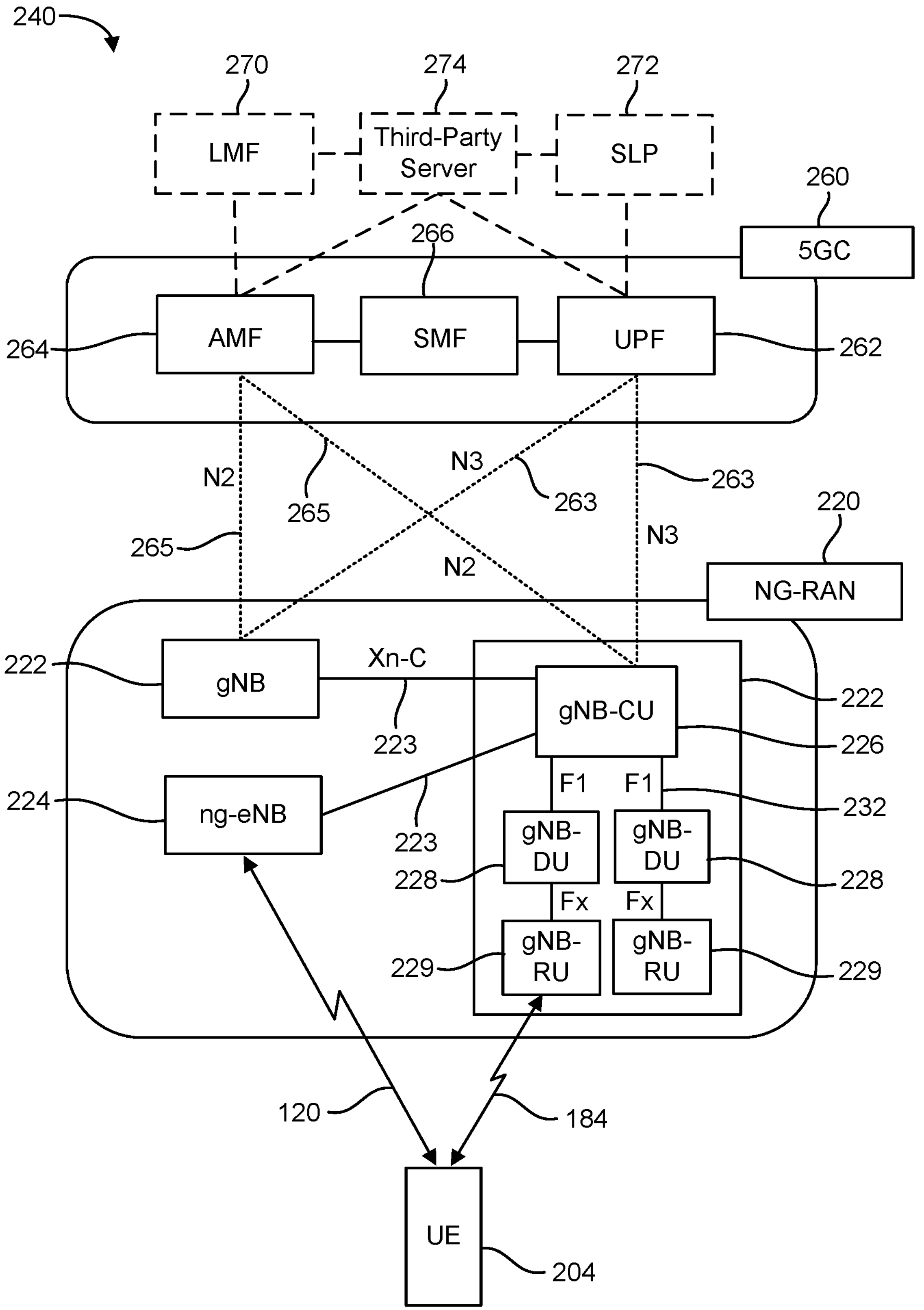

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the “N2” interface, and the interface between gNB(s) 222 and/or ng-eNB(s) 224 and the UPF 262 is referred to as the “N3” interface. The gNB(s) 222 and/or ng-eNB(s) 224 of the NG-RAN 220 may communicate directly with each other via backhaul connections 223, referred to as the “Xn-C” interface. One or more of gNBs 222 and/or ng-eNBs 224 may communicate with one or more UEs 204 over a wireless interface, referred to as the “Uu” interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the “F1” interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the “Fx” interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
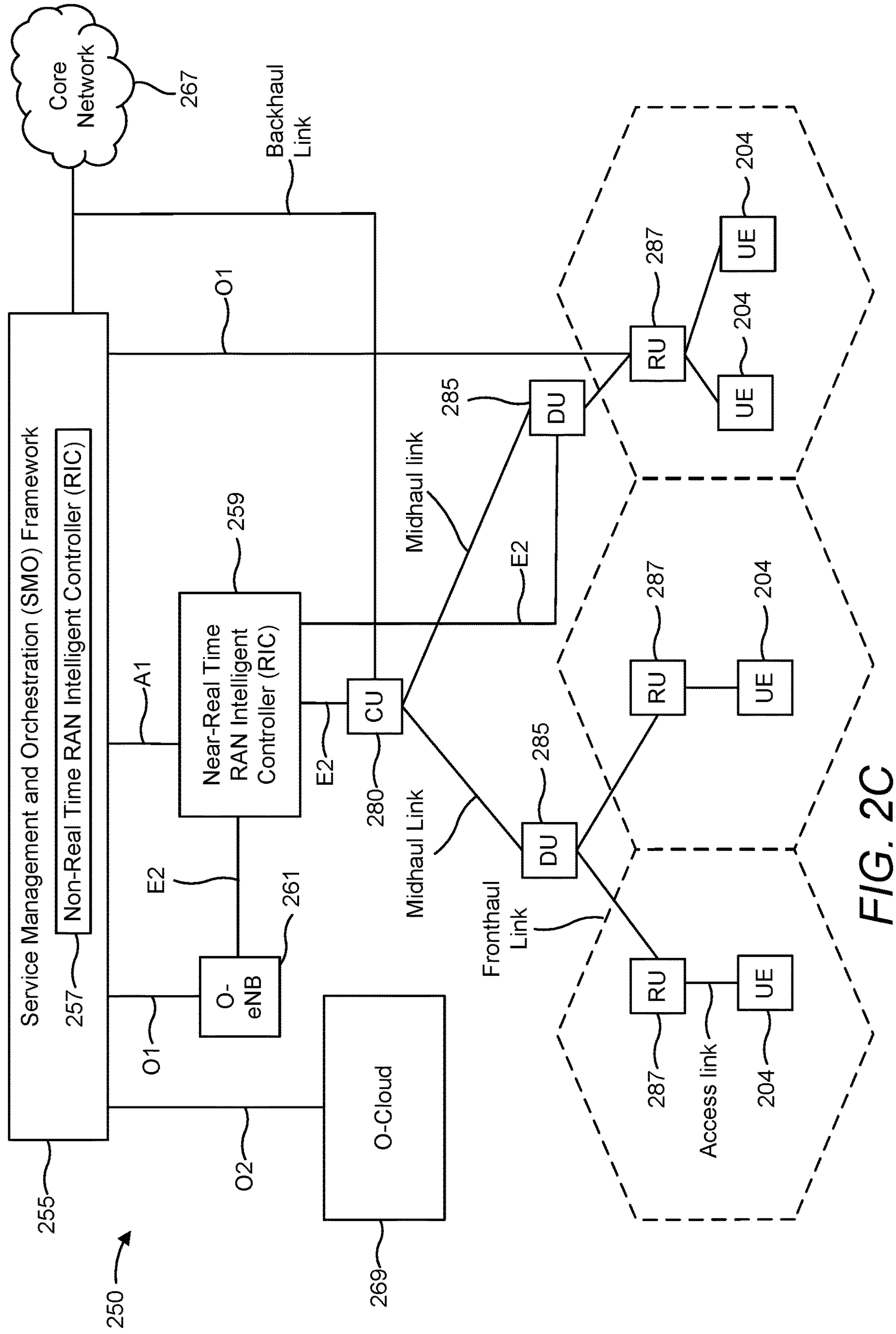

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Moreover, in some aspects, further studies in 3GPP on Ambient IoT (also known as Passive IoT in some examples) may include: use cases of interest not captured elsewhere in 3GPP, e.g., identification, tracking, and monitoring; scenarios of interest including public or private network, indoor or outdoor environment, and macro, micro, or pico cells; existing solutions that address the use cases of interest (e.g., Radio Frequency Identification, RFID); determination of feasibility of use cases and scenarios; design targets including link budget, data rate, power consumption, cost, supported energy sources or energy harvesting techniques; and coexistence with UEs and infrastructure in frequency bands for current 3GPP technologies.

In some aspects, an RFID system may be implemented integrally or in parallel (e.g., based on the same devices such as TRPs or UEs or based on the same radio resources) with the communications system 100 described above. In some aspects, a typical RFID system may include RFID stations and RFID tags. In some aspects, an RFID station may be configured to transmit RFID interrogating signals to an RFID tag. In some examples, an RFID station may be configured to receive RFID response signals from an RFID tag in response to the RFID interrogating signals. In some aspects, an RFID station that is configured to transmit an interrogating signal and receive a response signal may be referred to as an RF reader. In some aspects, an RFID station may be implemented with larger memory and computational resources than an RFID tag.

In some aspects, an RFID system may be used in many ways for locating and identifying objects to which the corresponding RFID tags are attached, as well as reading and/or writing information to/from the RFID tags. In some examples, an RFID system may be used in various applications in product-related and service-related industries for tracking objects being processed, inventoried, or handled. In such cases, an RFID tag is usually attached to an individual item or to a package.

In some aspects, in operation, an RFID station or an RFID reader may transmit an interrogating signal to interrogate one or more RFID tags. The interrogating signal may be encoded with one or more commands that instruct the RFID tags to perform one or more actions.

In some aspects, an RFID tag that senses the interrogating signal may respond by transmitting back a response signal. In many applications, the RFID tag may adjust an impedance of its antenna and transmit the response signal by reflecting a portion of the interrogating signal in a process known as backscattering. In some implementations, an RFID tag may actively generate and transmit the response signal.

In some aspects, the response signal from the RFID tag may include a message that is encoded with data stored in the RFID tag, such as a serial number, a price, a date, a time, a destination, an encrypted message, an electronic signature, other attribute(s), any combination of attributes, and so on. The response signal is then received by the RFID station, where the message is demodulated and decoded by the RFID station.

In some aspects, the RFID tags may be categorized into three types of devices based on their capabilities, including passive RFID tags, semi-passive RFID tags, and active RFID tags.

In some aspects, a passive RFID tag may have no power source and may transmit the response signal by backscattering. In some aspects, a passive RFID tag may harvest electrical energy from ambient signals to power up. In some aspects, a passive RFID tag may have a limited computational capability and may not have the ability for advanced signal processing or operations (e.g., analog-to-digital conversion or digital-to-analog conversion). In some aspects, a semi-passive RFID tag may have its own power source and may still transmit the response signal by backscattering. In some aspects, a semi-passive RFID tag may have an on-board limited power source that can be used to energize a microchip thereon.

In some aspects, an active RFID tag may have an on-board power source, and may generate and transmit the response signal by active transmission powered by the on-board power source. In some aspects, an active RFID tag may transmit the response signal to an RFID station regardless of whether the RFID tag is within a coverage range of the RFID station.

Figure 3:
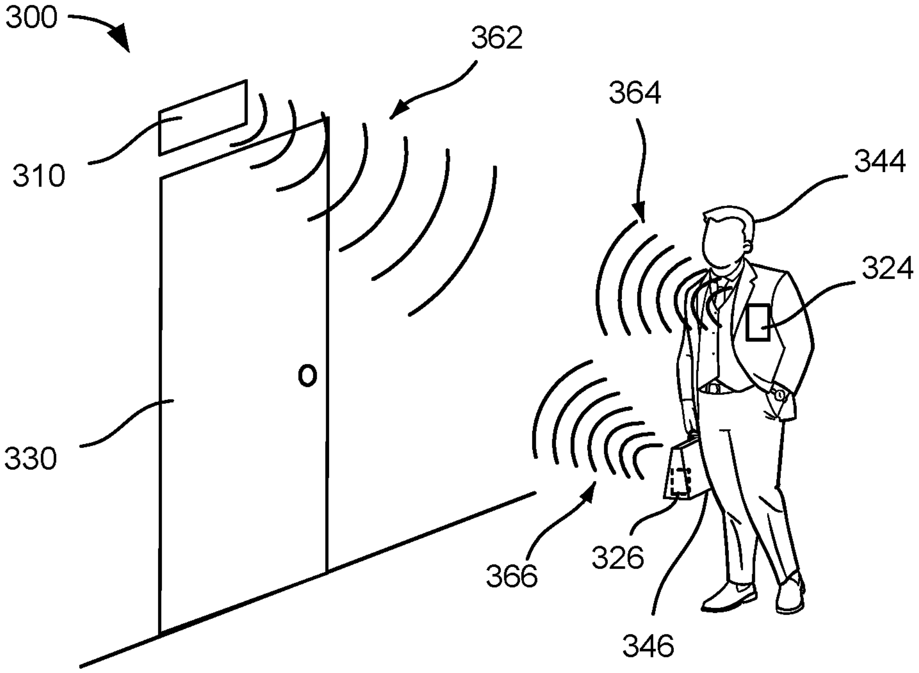
FIG. 3 illustrates an example Radio Frequency Identification (RFID) system, according to aspects of the disclosure.

FIG. 3 illustrates an example RFID system 300, according to aspects of the disclosure. In some aspects, the RFID system 300 includes an RFID station 310 configured as an RFID reader and RFID tags 324 and 326. In this example, the RFID station 310 is for controlling the access to the door 330.

As shown in FIG. 3, a person 344 (e.g., an employee) carrying an asset 346 (e.g., a suitcase) may want to access the door 330. The person 344 may carry the RFID tag 324 (e.g., embedded in an RFID enabled access card), and the asset 346 may have the RFID tag 326 (e.g., an RFID asset tag) attached thereon. To identify the person 344 or the asset 346 in order to grant or deny the access to the door 330, the RFID station 310 may transmit an interrogating signal 362. In response to the interrogating signal 362, the RFID tag 324 may transmit a backscattered response signal 364, and the RFID tag 326 may transmit a backscattered response signal 366. The backscattered response signal 364 may be modulated with data stored in the RFID tag 324 in response to a command encoded in the interrogating signal 362. Also, the backscattered response signal 366 may be modulated with data stored in the RFID tag 326 in response to the command encoded in the interrogating signal 362. The RFID station 310 may receive and decode the backscattered response signals 364 and 366 in order to obtain the response provided by the RFID tags 324 and 326.

FIG. 3 shows a possible application of an RFID system. In some aspects, applications of the RFID technology may include automated checkout, monitoring medication intakes for elderlies, vehicle ignition keys, employee attendance system, positioning objects, or tracking objects. In some aspects, the RFID tags may be attached to, embedded in, or integrally formed with a target or an object, including a wireless communications device, a shipping container, a merchandise, an identification card, a payment card, an automobile, or a pet.

In some aspects, the RFID station 310 may be configured to communicate with the RFID tags 324 and 326 over an air interface based on one or more RFID standards or wireless communications standards, such as those set by the International Organization for Standardization (ISO), the International Electrotechnical Commission (IEC), American Society for Testing and Materials (ASTM) International, the DASH7 Alliance, Electronic Product Code Global (EPC-global), and/or 3GPP standards for Ambient IoT. In some examples, based on the frequency band of the air interface, the RFID technology may be referred to as Low Frequency (LF) RFID (e.g., from 30 kHz to 300 kHz), High Frequency (HF) RFID (e.g., from 3 MHz to 30 MHz), or Ultra High Frequency (UHF) RFID (e.g., from 300 MHz to 3 GHz).

In some aspects, an RFID system may be implemented integrally or in parallel with a wireless communications system (e.g., the LTE or 5G NR as described above), and the RFID interrogating signals may be transmitted over a radio resource of the wireless communications system.

Figure 4A:
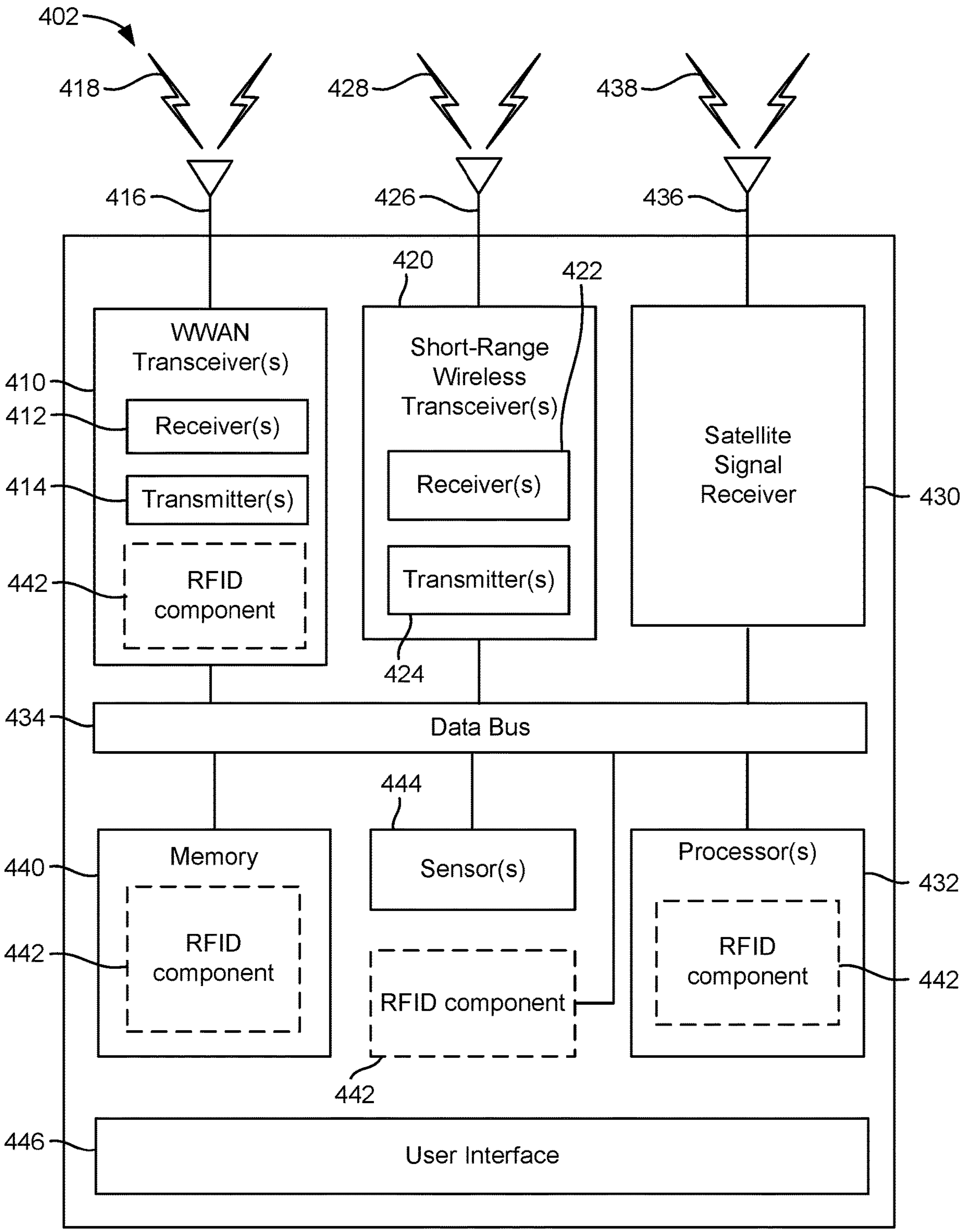
FIGS. 4A, 4B, and 4C are simplified block diagrams of several sample aspects of components that may be employed in a user equipment (UE), a base station, and a network entity, respectively, and configured to support communications as taught herein.
Figure 4B:
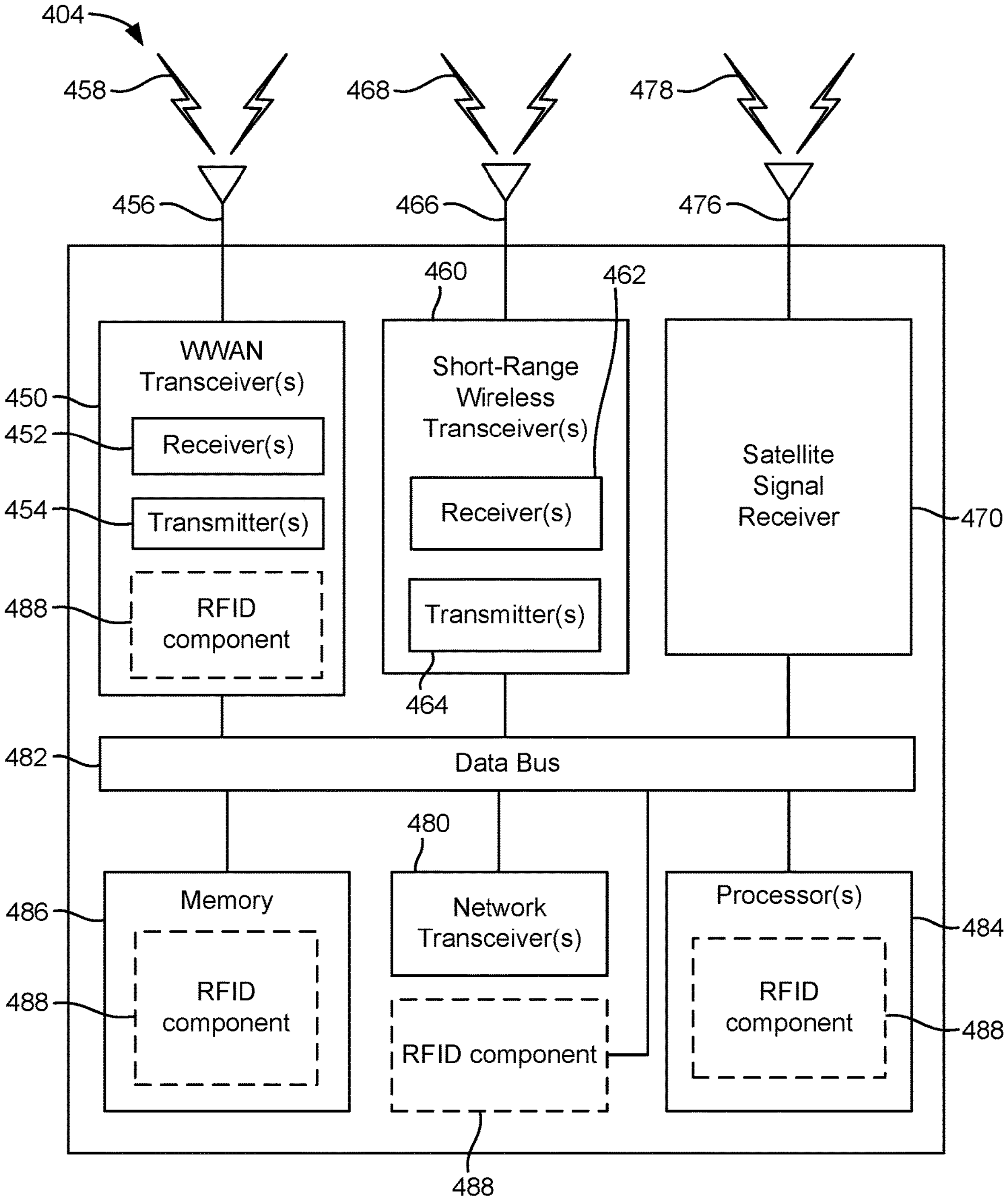
Figure 4C:
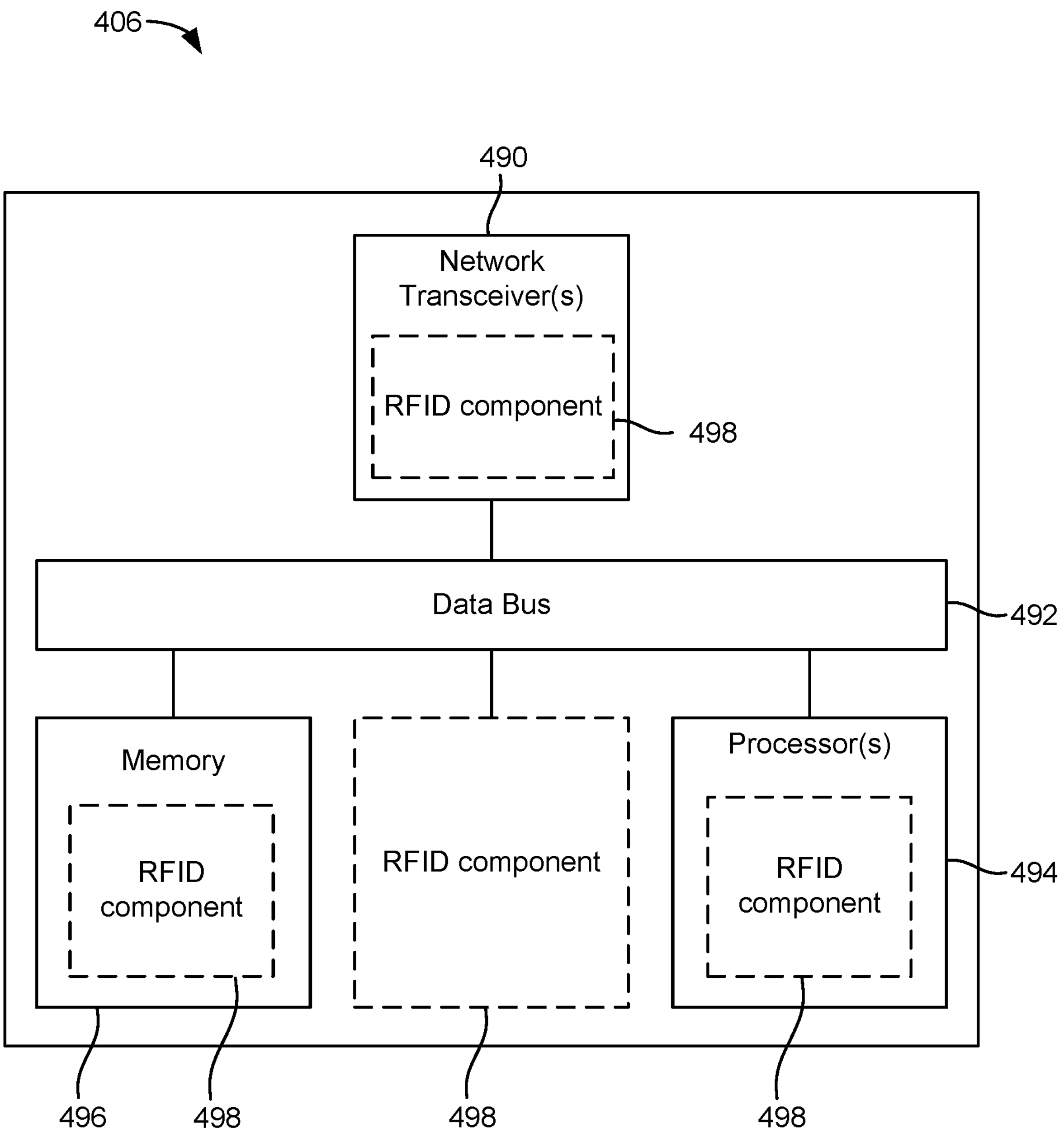

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include one or more wireless wide area network (WWAN) transceivers 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may each be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 each also include, at least in some cases, one or more short-range wireless transceivers 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 402 and the base station 404 also include, at least in some cases, satellite signal receivers 430 and 470. The satellite signal receivers 430 and 470 may be connected to one or more antennas 436 and 476, respectively, and may provide means for receiving and/or measuring satellite positioning/communication signals 438 and 478, respectively. Where the satellite signal receivers 430 and 470 are satellite positioning system receivers, the satellite positioning/communication signals 438 and 478 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 430 and 470 are non-terrestrial network (NTN) receivers, the satellite positioning/communication signals 438 and 478 may be communication signals (e.g., carrying control and/or user data) originating from a 5G network. The satellite signal receivers 430 and 470 may comprise any suitable hardware and/or software for receiving and processing satellite positioning/communication signals 438 and 478, respectively. The satellite signal receivers 430 and 470 may request information and operations as appropriate from the other systems, and, at least in some cases, perform calculations to determine locations of the UE 402 and the base station 404, respectively, using measurements obtained by any suitable satellite positioning system algorithm.

The base station 404 and the network entity 406 each include one or more network transceivers 480 and 490, respectively, providing means for communicating (e.g., means for transmitting, means for receiving, etc.) with other network entities (e.g., other base stations 404, other network entities 406). For example, the base station 404 may employ the one or more network transceivers 480 to communicate with other base stations 404 or network entities 406 over one or more wired or wireless backhaul links. As another example, the network entity 406 may employ the one or more network transceivers 490 to communicate with one or more base station 404 over one or more wired or wireless backhaul links, or with other network entities 406 over one or more wired or wireless core network interfaces.

A transceiver may be configured to communicate over a wired or wireless link. A transceiver (whether a wired transceiver or a wireless transceiver) includes transmitter circuitry (e.g., transmitters 414, 424, 454, 464) and receiver circuitry (e.g., receivers 412, 422, 452, 462). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 480 and 490 in some implementations) may be coupled to one or more wired network interface ports. Wireless transmitter circuitry (e.g., transmitters 414, 424, 454, 464) may include or be coupled to a plurality of antennas (e.g., antennas 416, 426, 456, 466), such as an antenna array, that permits the respective apparatus (e.g., UE 402, base station 404) to perform transmit “beamforming,” as described herein. Similarly, wireless receiver circuitry (e.g., receivers 412, 422, 452, 462) may include or be coupled to a plurality of antennas (e.g., antennas 416, 426, 456, 466), such as an antenna array, that permits the respective apparatus (e.g., UE 402, base station 404) to perform receive beamforming, as described herein. In an aspect, the transmitter circuitry and receiver circuitry may share the same plurality of antennas (e.g., antennas 416, 426, 456, 466), such that the respective apparatus can only receive or transmit at a given time, not both at the same time. A wireless transceiver (e.g., WWAN transceivers 410 and 450, short-range wireless transceivers 420 and 460) may also include a network listen module (NLM) or the like for performing various measurements.

As used herein, the various wireless transceivers (e.g., transceivers 410, 420, 450, and 460, and network transceivers 480 and 490 in some implementations) and wired transceivers (e.g., network transceivers 480 and 490 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 402) and a base station (e.g., base station 404) will generally relate to signaling via a wireless transceiver.

The UE 402, the base station 404, and the network entity 406 also include other components that may be used in conjunction with the operations as disclosed herein. The UE 402, the base station 404, and the network entity 406 include one or more processors 432, 484, and 494, respectively, for providing functionality relating to, for example, wireless communication, and for providing other processing functionality. The processors 432, 484, and 494 may therefore provide means for processing, such as means for determining, means for calculating, means for receiving, means for transmitting, means for indicating, etc. In an aspect, the processors 432, 484, and 494 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 402, the base station 404, and the network entity 406 include memory circuitry implementing memories 440, 486, and 496 (e.g., each including a memory device), respectively, for maintaining information (e.g., information indicative of reserved resources, thresholds, parameters, and so on). The memories 440, 486, and 496 may therefore provide means for storing, means for retrieving, means for maintaining, etc. In some cases, the UE 402, the base station 404, and the network entity 406 may include RFID component 442, 488, and 498, respectively. The RFID component 442, 488, and 498 may be hardware circuits that are part of or coupled to the processors 432, 484, and 494, respectively, that, when executed, cause the UE 402, the base station 404, and the network entity 406 to perform the functionality described herein. In other aspects, the RFID component 442, 488, and 498 may be external to the processors 432, 484, and 494 (e.g., part of a modem processing system, integrated with another processing system, etc.). Alternatively, the RFID component 442, 488, and 498 may be memory modules stored in the memories 440, 486, and 496, respectively, that, when executed by the processors 432, 484, and 494 (or a modem processing system, another processing system, etc.), cause the UE 402, the base station 404, and the network entity 406 to perform the functionality described herein. FIG. 4A illustrates possible locations of the RFID component 442, which may be, for example, part of the one or more WWAN transceivers 410, the memory 440, the one or more processors 432, or any combination thereof, or may be a standalone component. FIG. 4B illustrates possible locations of the RFID component 488, which may be, for example, part of the one or more WWAN transceivers 450, the memory 486, the one or more processors 484, or any combination thereof, or may be a standalone component. FIG. 4C illustrates possible locations of the RFID component 498, which may be, for example, part of the one or more network transceivers 490, the memory 496, the one or more processors 494, or any combination thereof, or may be a standalone component.

The UE 402 may include one or more sensors 444 coupled to the one or more processors 432 to provide means for sensing or detecting movement and/or orientation information that is independent of motion data derived from signals received by the one or more WWAN transceivers 410, the one or more short-range wireless transceivers 420, and/or the satellite signal receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in two-dimensional (2D) and/or three-dimensional (3D) coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the one or more processors 484 in more detail, in the downlink, IP packets from the network entity 406 may be provided to the processor 484. The one or more processors 484 may implement functionality for an RRC layer, a packet data convergence protocol (PDCP) layer, a radio link control (RLC) layer, and a medium access control (MAC) layer. The one or more processors 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the one or more processors 432. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the one or more processors 432, which implements Layer-3 (L3) and Layer-2 (L2) functionality.

In the downlink, the one or more processors 432 provides demultiplexing between transport and logical channels, packet reassembly, deciphering, header decompression, and control signal processing to recover IP packets from the core network. The one or more processors 432 are also responsible for error detection.

Similar to the functionality described in connection with the downlink transmission by the base station 404, the one or more processors 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the one or more processors 484.

In the uplink, the one or more processors 484 provides demultiplexing between transport and logical channels, packet reassembly, deciphering, header decompression, control signal processing to recover IP packets from the UE 402. IP packets from the one or more processors 484 may be provided to the core network. The one or more processors 484 are also responsible for error detection.

For convenience, the UE 402, the base station 404, and/or the network entity 406 are shown in FIGS. 4A, 4B, and 4C as including various components that may be configured according to the various examples described herein. It will be appreciated, however, that the illustrated components may have different functionality in different designs. In particular, various components in FIGS. 4A to 4C are optional in alternative configurations and the various aspects include configurations that may vary due to design choice, costs, use of the device, or other considerations. For example, in case of FIG. 4A, a particular implementation of UE 402 may omit the WWAN transceiver(s) 410 (e.g., a wearable device or tablet computer or personal computer (PC) or laptop may have Wi-Fi and/or BLUETOOTH® capability without cellular capability), or may omit the short-range wireless transceiver(s) 420 (e.g., cellular-only, etc.), or may omit the satellite signal receiver 430, or may omit the sensor(s) 444, and so on. In another example, in case of FIG. 4B, a particular implementation of the base station 404 may omit the WWAN transceiver(s) 450 (e.g., a Wi-Fi "hotspot" access point without cellular capability), or may omit the short-range wireless transceiver(s) 460 (e.g., cellular-only, etc.), or may omit the satellite signal receiver 470, and so on. For brevity, illustration of the various alternative configurations is not provided herein, but would be readily understandable to one skilled in the art.

The various components of the UE 402, the base station 404, and the network entity 406 may be communicatively coupled to each other over data buses 434, 482, and 492, respectively. In an aspect, the data buses 434, 482, and 492 may form, or be part of, a communication interface of the UE 402, the base station 404, and the network entity 406, respectively. For example, where different logical entities are embodied in the same device (e.g., gNB and location server functionality incorporated into the same base station 404), the data buses 434, 482, and 492 may provide communication between them.

The components of FIGS. 4A, 4B, and 4C may be implemented in various ways. In some implementations, the components of FIGS. 4A, 4B, and 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processors 432, 484, 494, the transceivers 410, 420, 450, and 460, the memories 440, 486, and 496, the RFID component 442, 488, and 498, etc.

In some designs, the network entity 406 may be implemented as a core network component. In other designs, the network entity 406 may be distinct from a network operator or operation of the cellular network infrastructure (e.g., NG RAN 220 and/or 5GC 210/260). For example, the network entity 406 may be a component of a private network that may be configured to communicate with the UE 402 via the base station 404 or independently from the base station 404 (e.g., over a non-cellular communication link, such as Wi-Fi).

Figure 5:
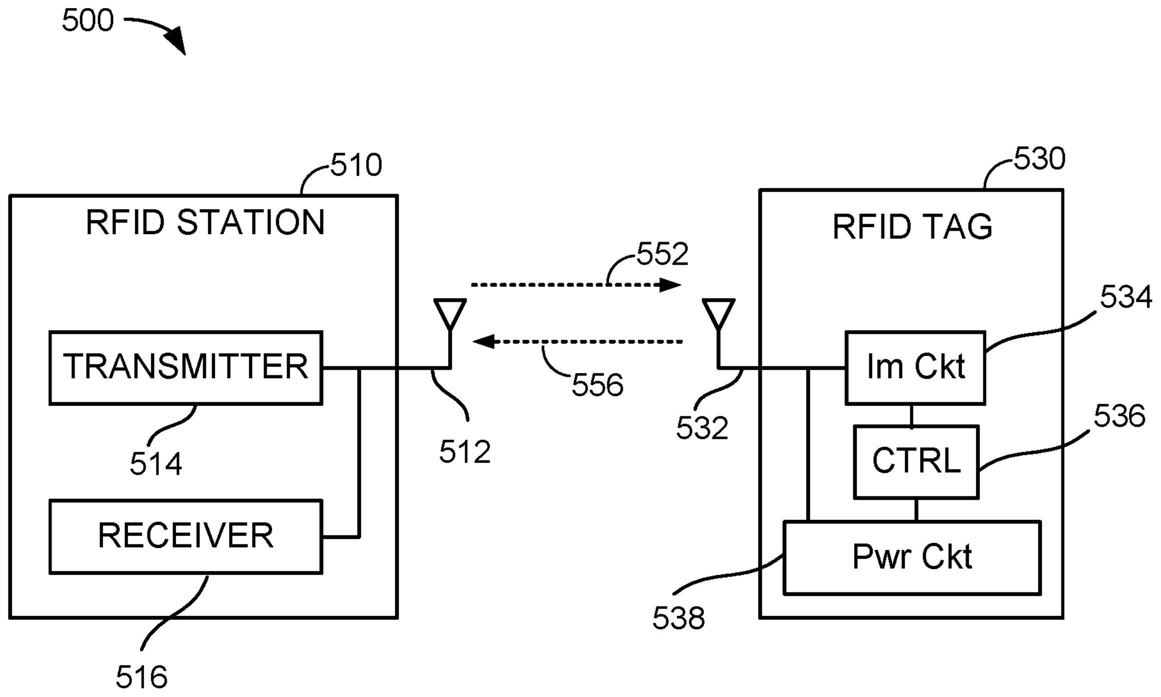
FIG. 5 illustrates a simplified block diagram of an RFID station and an RFID tag in an RFID system, according to aspects of the disclosure.

FIG. 5 illustrates a simplified block diagram of an RFID station 510 and an RFID tag 530 in an RFID system 500, according to aspects of the disclosure. In some aspects, the RFID station 510 may be an RFID reader and correspond to the RFID station 310 in FIG. 3. In some aspects, the RFID tag 550 may correspond to the RFID tag 324 or 326 in FIG. 3.

As shown in FIG. 5, the RFID station 510 includes an antenna 512, and a transmitter 514 and a receiver 516 electrically coupled with the antenna 512. Also, the RFID tag 530 includes an antenna 532, antenna impedance adjusting circuitry 534 (abbreviated as "Im Ckt" in FIG. 5) configured to adjust an impedance of the antenna 532, a controller 536 (abbreviated as "CTRL" in FIG. 5) configured to control the antenna impedance adjusting circuitry 534, and power circuitry 538 (abbreviated as "Pwr Ckt" in FIG. 5) configured to provide the electrical power to the controller 536 and the antenna impedance adjusting circuitry 534.

In some aspects, a TRP in a wireless communications system may be configured to function as, or to incorporate, the RFID station 510. In such scenario, the RFID station 510 may correspond to the base station 404, the transmitter 514 may correspond to the transmitter 454 and/or the RFID component 488 in the WWAN transceivers 450, or the transmitter 464 in the short-range wireless transceivers 460; the receiver 516 may correspond to the receiver 452 and/or the RFID component 488 in the WWAN transceivers 450, or the receiver 462 in the short-range wireless transceivers 460; and the antenna 512 may correspond to the antenna 456 or the antenna 466. In some aspects, a UE in a wireless communications system may be configured to function as, or to incorporate, the RFID station 510. In such scenario, the RFID station 510 may correspond to the UE 402, the transmitter 514 may correspond to the transmitter 414 and/or the RFID component 442 in the WWAN transceivers 420, or the transmitter 424 in the short-range wireless transceivers 420; the receiver 516 may correspond to the receiver 412 and/or the RFID component 442 in the WWAN transceivers 420, or the receiver 422 in the short-range wireless transceivers 420; and the antenna 512 may correspond to the antenna 416 or the antenna 426.

In some aspects, a UE in a wireless communications system may be configured to function as, or to incorporate, the RFID tag 530. In such scenario, the RFID tag 530 may correspond to the UE 402, the antenna impedance adjusting circuitry 534, the controller 536, and the power circuitry 538 may correspond to the RFID component 442, and the antenna 532 may correspond to the antenna 416 or the antenna 426.

In some aspects, in operation, the transmitter 514 of the RFID station 510 may transmit an interrogating signal 552 via the antenna 512 to the RFID tag 530. In some aspects, the interrogating signal 552 may be embedded with a command from the RFID station 510. The command may provide the RFID tag 530 a time frame for responding to the interrogating signal 552, instruct the RFID tag 530 to provide its identification code or other information related to the identity or capability of the RFID tag 530, or both. The RFID tag 530, when being powered on and upon receiving the interrogating signal 552, may cause the controller 536 to prepare a response based on the embedded command and to control the antenna impedance adjusting circuitry 534 to adjust an impedance of the antenna 532 based on the prepared response. The antenna 532 may reflect the interrogating signal 552, and the reflected signal may also be referred to as a backscattered signal 556. As the impedance of the antenna 532 varies, the amplitude, phase, and/or frequency of the backscattered signal 556 may vary. Accordingly, the controller 536 may modulate the backscattered signal 556 to carry the response by adjusting the impedance of the antenna 532.

In some aspects, the RFID tag 530 may be a passive RFID tag. In such scenario, the power circuitry 538 may harvest the electrical power from the interrogating signal 552 to power the controller 536 and the antenna impedance adjusting circuitry 534. In some aspects, the RFID tag 530 may be a semi-passive RFID tag. In such scenario, the power circuitry 538 may power the controller 536 and the antenna impedance adjusting circuitry 534 based on the harvested power from the interrogating signal 552 or an on-board battery (not shown) of the RFID tag 530. Also, in some examples, the power circuitry 538 may perform the energy harvesting functionality for detecting the presence or absence of the interrogating signal 552.

Moreover, the receiver 516 of the RFID station 510 may receive the backscattered signal 556 from the RFID tag 530 via the antenna 512. The RFID station 510 may decode the backscattered signal 556 to obtain the response provided by the RFID tag 530. In some aspects, the RFID system 500 may be used to measure a range or estimate a position of the RFID tag 530. In such application, the RFID station 510 may also measure a time of arrival (ToA) of the backscattered signal 556 as observed at the RFID station 510.

In some aspects, as the RFID system 500 may be implemented integrally or in parallel with a wireless communications system (e.g., the LTE or 5G NR as described above), the RFID interrogating signal 552 may be transmitted over a radio resource of the wireless communications system. In some aspects, the RFID system 500 may be used to perform a positioning procedure of the RFID tag 530 based on the backscattered signal from the RFID tag 530 (also referred to as a backscatter-based positioning procedure), where the RFID system 500 may transmit a positioning reference signal as an interrogating signal, or transmit the interrogating signal over a radio resource of the positioning reference signal of a wireless communications system. In some examples, the positioning reference signal may be a downlink positioning reference signal (DL-PRS), a sidelink positioning reference signal (SL-PRS), or a sounding reference signal (SRS).

Figure 6:
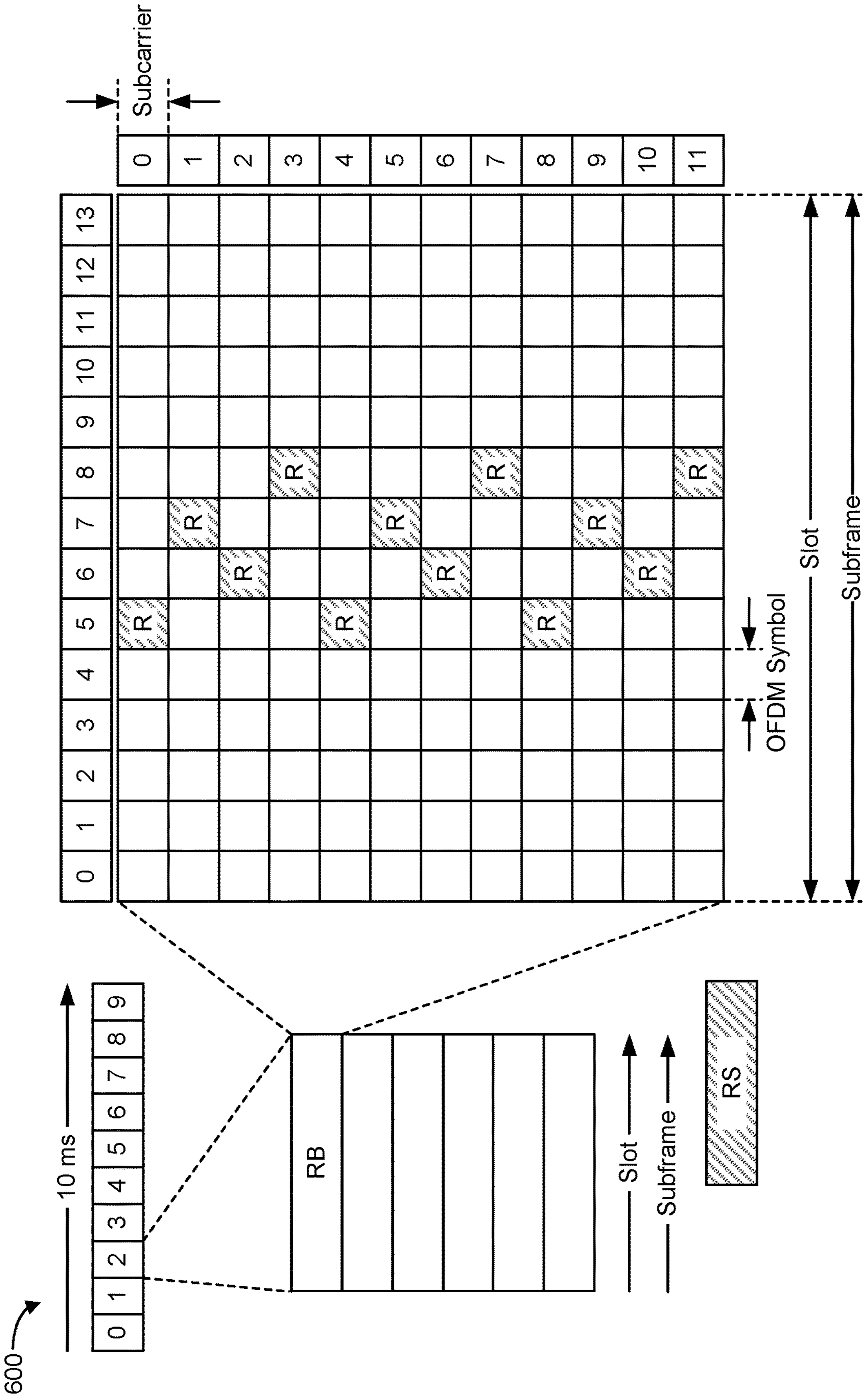
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 7:
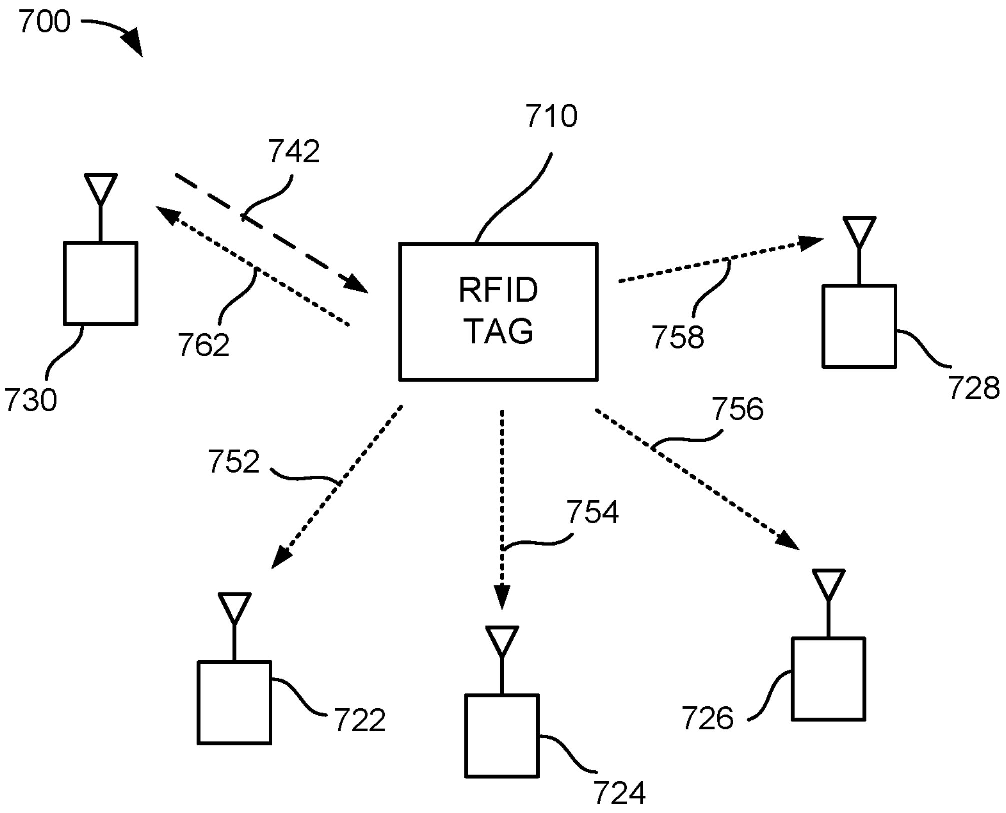
FIG. 7 illustrates an example RFID system for a backscatter-based positioning procedure, according to aspects of the disclosure.

FIG. 7 illustrates an example RFID system 700 for a backscatter-based positioning procedure, according to aspects of the disclosure. The RFID system 700 includes an RFID tag 710, and a position of which is to be determined based on the backscatter-based positioning procedure. The RFID system 700 includes one or more receiving RFID stations 722, 724, 726, and 728. The RFID system 700 further includes a transmitting RFID station 730. In some examples, the RFID station 730 may also be configured as a receiving RFID station. In some aspects, the RFID system 700 may include one or more transmitting RFID stations.

In some aspects, the RFID tag 710 may be a standalone RFID tag, or may be a device configured to function as an RFID tag. In some aspect, the RFID tag 710 may correspond to the RFID tags described in FIG. 3 or FIG. 5. In some aspects, the RFID stations 722, 724, 726, 728, and 730 may correspond to the RFID stations described in FIG. 3 or FIG. 5. In some aspects, each one of the RFID stations 722, 724, 726, 728, and 730 may be a UE (such as any UE described above) or a TRP (such as any TRP described above) of a wireless communications network.

In some aspects, to perform the backscatter-based positioning procedure, the RFID station 730 may transmit an interrogating signal 742 to the RFID tag 710. In some aspects, the interrogating signal 742 may be a positioning reference signal of the wireless communications network, such as DL-PRS, SL-PRS, or SRS. In response to the interrogating signal 742, the RFID tag 710 may transmit a backscattered signal by reflecting (also referred to as backscattering in this disclosure) the interrogating signal 742. The backscattered signal may be observed at the RFID stations 722, 724, 726, 728, and 730 and labeled in FIG. 7 as respective received backscattered signals 752, 754, 756, 758, and 762.

In some aspects, the RFID stations 722, 724, 726, 728, and 730 may record the time points the received backscattered signals 752, 754, 756, 758, and 762 arrive. Based on the measured reception time points and the time of transmission of the interrogating signal 742 at the RFID station 730, the combined propagation time of the interrogating signal 742 and the received backscattered signals 752, 754, 756, 758, and 762, denoted as $\tau_1$, $\tau_2$, $\tau_3$, $\tau_4$, and $\tau_0$, may satisfy the following expressions:

$$\tau_1 = \tau_{tx-TAG} + \tau_{TAG-rx1},$$

$$\tau_2 = \tau_{tx-TAG} + \tau_{TAG-rx2},$$

$$\tau_3 = \tau_{tx-TAG} + \tau_{TAG-rx3},$$

$$\tau_4 = \tau_{tx-TAG} + \tau_{TAG-rx4},$$

$$\tau_0 = \tau_{tx-TAG} + \tau_{TAG-rx0},$$

and $$\tau_{tx-TAG} = \tau_{TAG-rx0}.$$

$\tau_{tx-TAG}$ represents the propagation time from the transmitting RFID station 730 to the RFID tag 710. $\tau_{TAG-rx0}$ represents the propagation time from the RFID tag 710 to the transmitting RFID station 730. $\tau_{TAG-rx1}$ represents the propagation time from the RFID tag 710 to the receiving RFID station 722. $\tau_{TAG-rx2}$ represents the propagation time from the RFID tag 710 to the receiving RFID station 724. $\tau_{TAG-rx3}$ represents the propagation time from the RFID tag 710 to the receiving RFID station 726. $\tau_{TAG-rx4}$ represents the propagation time from the RFID tag 710 to the receiving RFID station 728.

In some aspects, based on $\tau_1$, $\tau_2$, $\tau_3$, $\tau_4$, and $\tau_0$, an estimated position of the RFID tag 710 may be determined based on a Time-of-Arrival (ToA) positioning method. In some examples, the time-of-arrival values may correspond to the propagation time values from the RFID tag 710 to the respective RFID stations 722, 724, 726, 728, and 730 may have the relationship of:

$$\tau_{TAG-rx0} = \frac{\tau_0}{2},$$

$$\tau_{TAG-rx1} = \tau_1 - \frac{\tau_0}{2},$$

$$\tau_{TAG-rx2} = \tau_2 - \frac{\tau_0}{2},$$

$$\tau_{TAG-rx3} = \tau_3 - \frac{\tau_0}{2},$$

$$\tau_{TAG-rx4} = \tau_4 - \frac{\tau_0}{2}.$$

The estimated ranges between the RFID tag 710 and the respective RFID stations 722, 724, 726, 728, and 730 may be calculated by multiplying the time-of-arrival values by the speed of the RF waves (e.g., the speed of light). Moreover, based on the estimated ranges and the position information of the RFID stations 722, 724, 726, 728, and 730, the estimated position of the RFID tag may be derived.

In some aspects, based on $\tau_1$, $\tau_2$, $\tau_3$, $\tau_4$, and $\tau_0$, an estimated position of the RFID tag 710 may be determined based on a Time Difference of Arrival (TDOA) positioning method. In some examples, the propagation time differences between any two of the RFID stations 722, 724, 726, 728, and 730 may have the expressions of: $\nabla\tau_{i,j} = \tau_{TAG-rxi} - \tau_{TAG-rxj} = \tau_i - \tau_j$, where i an j represents the corresponding two of the RFID stations 722, 724, 726, 728, and 730. The estimated curves that pass through the RFID tag 710 may be determined based on the multiplication of propagation time differences and the speed of the RF waves (e.g., the speed of light), and the estimated position of the RFID tag 710 may be derived based on cross-sections of the estimated curves.

In some aspects, based on $\tau_0$, an estimated range between the RFID tag 710 and the RFID station 730 may also be determined based on a Round Trip Time (RTT) positioning method.

FIG. 7 shows a non-limiting example for a backscatter-based positioning procedure having a transmitting RFID station that also functions as a receiving RFID station, together with four other receiving RFID stations. In some examples for performing a particular backscatter-based positioning procedure, the transmitting RFID station may be configured not to function as a receiving RFID station. Also, in some examples for performing a particular backscatter-based positioning procedure, a number of transmitting or receiving RFID stations may be different from the example shown in FIG. 7.

Figure 8A:
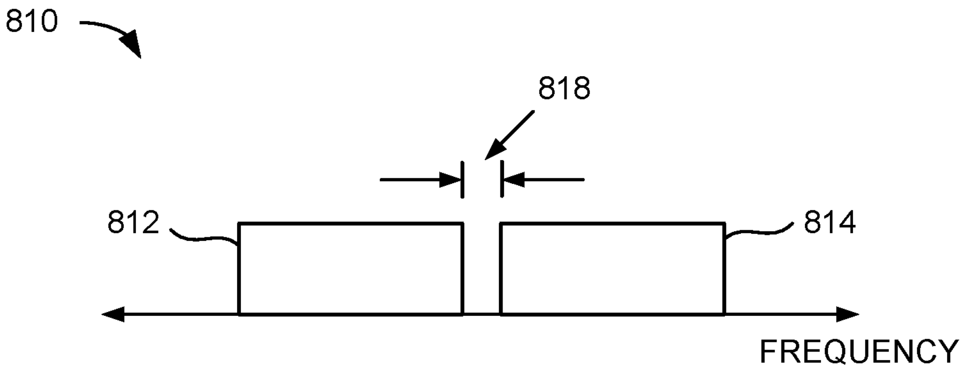
FIGS. 8A-8C are diagrams showing different examples of carrier aggregation for reference signals, according to aspects of the disclosure.
Figure 8B:
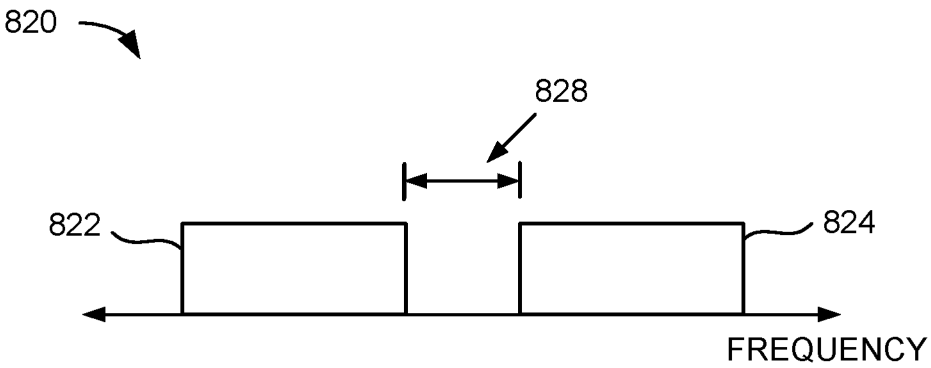
Figure 8C:
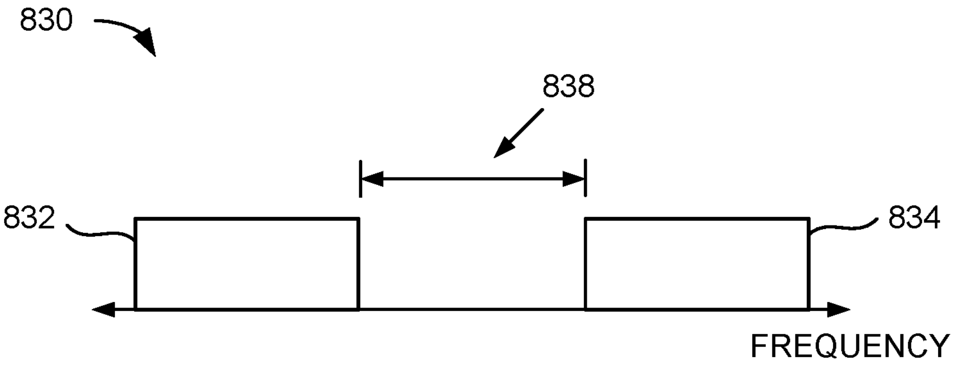

FIGS. 8A-8C are diagrams showing different examples of carrier aggregation for reference signals (such as PRS or SRS), according to aspects of the disclosure. The horizontal axis in each of FIGS. 8A-8C represents the frequency. In some aspects, in order to increase the accuracy of TOA estimation in the time domain, the bandwidth in the frequency domain for transmitting the reference signals for positioning may be increased. In some aspects, a better accuracy of TOA estimation may correspond to a better accuracy of position estimation.

In some aspects, carrier aggregation in the context of reference signals for positioning in this disclosure refers to transmitting the reference signals for positioning based on multiple component carriers. In some aspects, carrier aggregation may increase the effective bandwidth of the reference signals for positioning even with disjoint carriers or carriers with a gap in between.

FIG. 8A is a diagram 810 showing a first example carrier aggregation also referred to as an intra-band contiguous carrier aggregation. In this example, the reference signal may be transmitted over two component carriers 812 and 814 that are within the same frequency band (e.g., both in FR1 or both in FR2). In this example, the gap 818 between the two component carriers 812 and 814 may range from 0 (e.g., no gap) to 10 megahertz (MHz).

FIG. 8B is a diagram 820 showing a first example carrier aggregation also referred to as an intra-band non-contiguous carrier aggregation. In this example, the reference signal may be transmitted over two component carriers 822 and 824 that are within the same frequency band (e.g., both in FR1 or both in FR2). In this example, the gap 828 between the two component carriers 822 and 824 may be about 100 MHz or may range from greater than 10 MHz to 1000 MHz.

FIG. 8C is a diagram 830 showing a first example carrier aggregation also referred to as an inter-band carrier aggregation. In this example, the reference signal may be transmitted over two component carriers 832 and 834 that are in different frequency bands (e.g., one in FR1 and the other one in FR2). In this example, the gap 838 between the two component carriers 832 and 834 may be greater than 100 MHz or greater than 1000 MHz.

In FIGS. 8A-8C, each component carrier of the component carriers 812/814, 822/824, and 832/834 is depicted in a simplified manner indicating the component carrier assigned for the corresponding reference signal transmission. In some aspects, the actual reference signal transmissions may be further subject to scheduling and/or comb configurations within each of the component carrier.

Figure 9A:
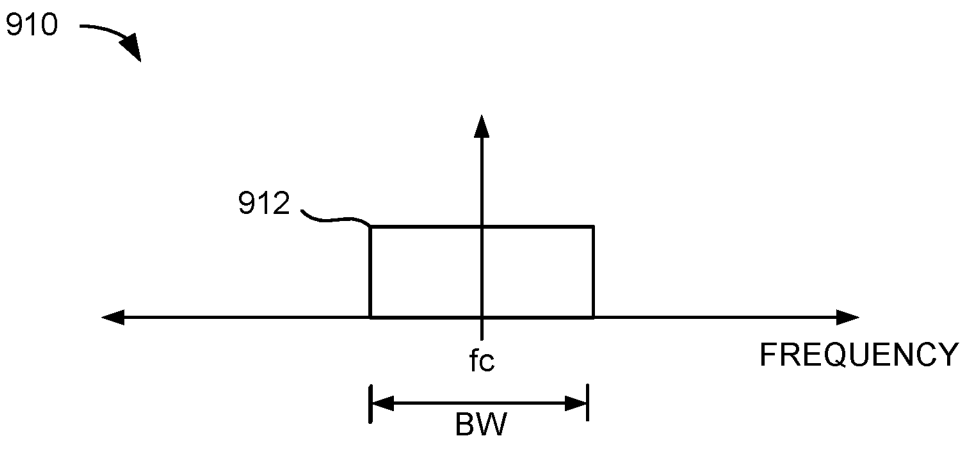
FIG. 9A is a diagram showing a reference signal received by a communication device, according to aspects of the disclosure.
Figure 9B:
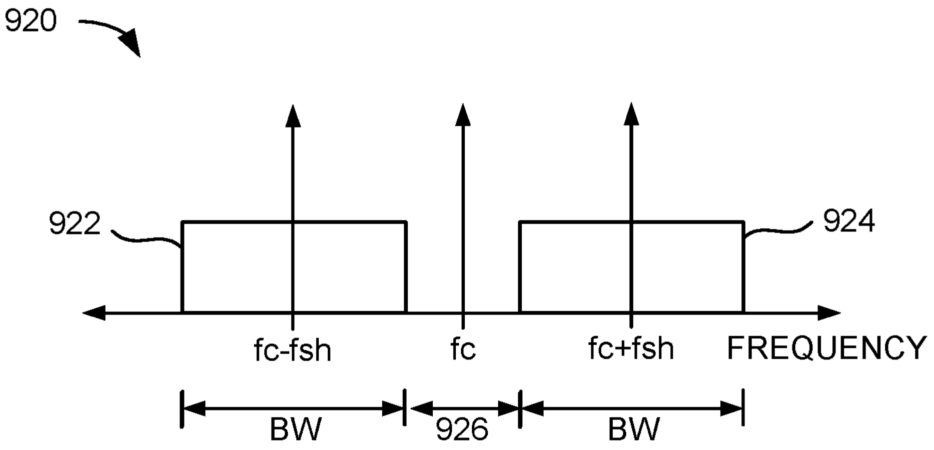
FIGS. 9B-9C are diagrams example backscattered signals transmitted by the communication device, according to aspects of the disclosure.
Figure 9C:
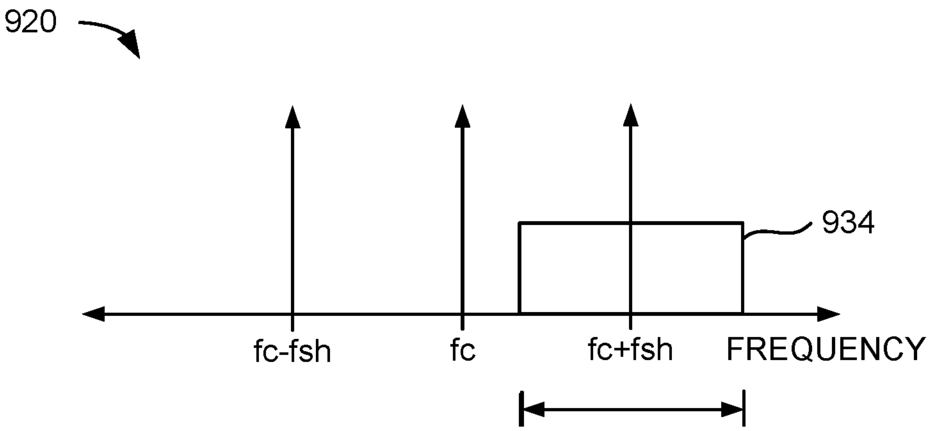

FIGS. 9A-9C are diagrams showing signals received and backscattered by a communication device (e.g., an ambient IoT device or an RFID tag), according to aspects of the disclosure. The horizontal axis in each of FIGS. 9A-9C represents the frequency.

FIG. 9A is a diagram 910 showing a reference signal received by the communication device, according to aspects of the disclosure. The received reference signal is based on a reference component carrier 912 that has a central frequency fc and a bandwidth BW. In some aspects, the communication device may transmit a backscattered signal with response data modulated to the backscattered signal by adjusting the impedance of the antenna of the communication device. In some aspects, when the communication device adjusting the impedance at a baseband frequency much lower than the central frequency fc, and the backscattered signal may be deemed as transmitted based on the same component carrier 912.

In some aspects, in addition to the modulation signal for the response data, the a communication device may switching between different impedance values of the antenna at a switching frequency (e.g., the shifting frequency fsh) much higher than the baseband frequency. FIG. 9B is a diagram 920 showing a first backscattered signal transmitted by the communication device, according to aspects of the disclosure. The first backscattered signal is based on two component carriers 922 and 924. The component carrier 922 has a central frequency of fc−fsh and a bandwidth BW; and the component carrier 924 has a central frequency of fc+fsh and a bandwidth BW.

In some aspects, the switching between different impedance values based on the switching frequency may function as an intermediate frequency (IF) mixer to shift the backscattered signal away from the central frequency fc of the reference signal without the added hardware and power consumption for an actual IF mixer, and thus may be more suitable for an communication device that is an ambient IoT device or an RFID tag. As shown in FIG. 9B, the switching between different impedance values may generate a double-sideband (DSB) signal with two bands (one having a central frequency at fc−fsh and one central having a central frequency at fc+fsh). The gap 926 between the component carrier 922 and the component carrier 924 may be determined based on an expression of 2−fsh−BW.

In some aspects, since the portions of the backscattered signal over the component carriers 922 and 924 in FIG. 9B indeed carry the same response data, one of the sidebands (e.g., one of the component carriers 922 and 924) may be suppressed and only the other one is transmitted (also referred to as single-sideband (SSB) transmission). FIG. 9C is a diagram 930 showing a second backscattered signal transmitted by the communication device, according to aspects of the disclosure. The second backscattered signal is based on one component carrier 934 that has a central frequency of fc+fsh and a bandwidth BW.

In some aspects, the suppression or cancellation of one sideband may be implemented based on splitting the backscattered signal into different component signals with different phases, and recombining the component signals such that the components over the unwanted sideband may cancel each other in the final backscattered signal. In some aspects, the SSB backscattering may be implemented based on configuring the impedance of the antenna to be switchable among different impedance values based on selectively connecting the antenna to different impedance branches, and controlling the on or off (or connected or disconnected) states of the impedance branches based on different clock signals of different phases in order to cancel the effect of the unwanted sideband and enhance the effect of the desirable sideband.

In some aspects, for the application of backscattered-based positioning, all the sidebands may be kept in order to have a backscattered signal with increased bandwidth by component carrier aggregation based on DSB frequency shifting (e.g., FIG. 9B). In some aspects, the embodiments illustrated in this application may increase the bandwidth of the backscattered signal compared with the reference signal. In some aspects, the positioning accuracy may be improved as the bandwidth of the backscattered signal is increased. In some aspects, the processing loading and resources allocated at the transmitter of the reference signal (e.g., a communication station such as a TRP or an RFID station) may be reduced as the reference signal only takes up a portion of the bandwidth of the backscattered signal.

In some aspects, to perform carrier aggregation at the transmitter side, either based on SSB frequency shifting (e.g., FIG. 9A) or no frequency shifting, the same number of component carriers would need to be committed at the transmitter side. In contrast, by allowing carrier aggregation at the communication device side, the proposed solution as illustrated with reference to at least FIG. 9B and the following figures may provide the flexibility of allocating less resources for positioning at the transmitter side while maintaining same overall received bandwidth compared to the case where the carrier aggregation is performed at the transmitter side.

Figure 10:
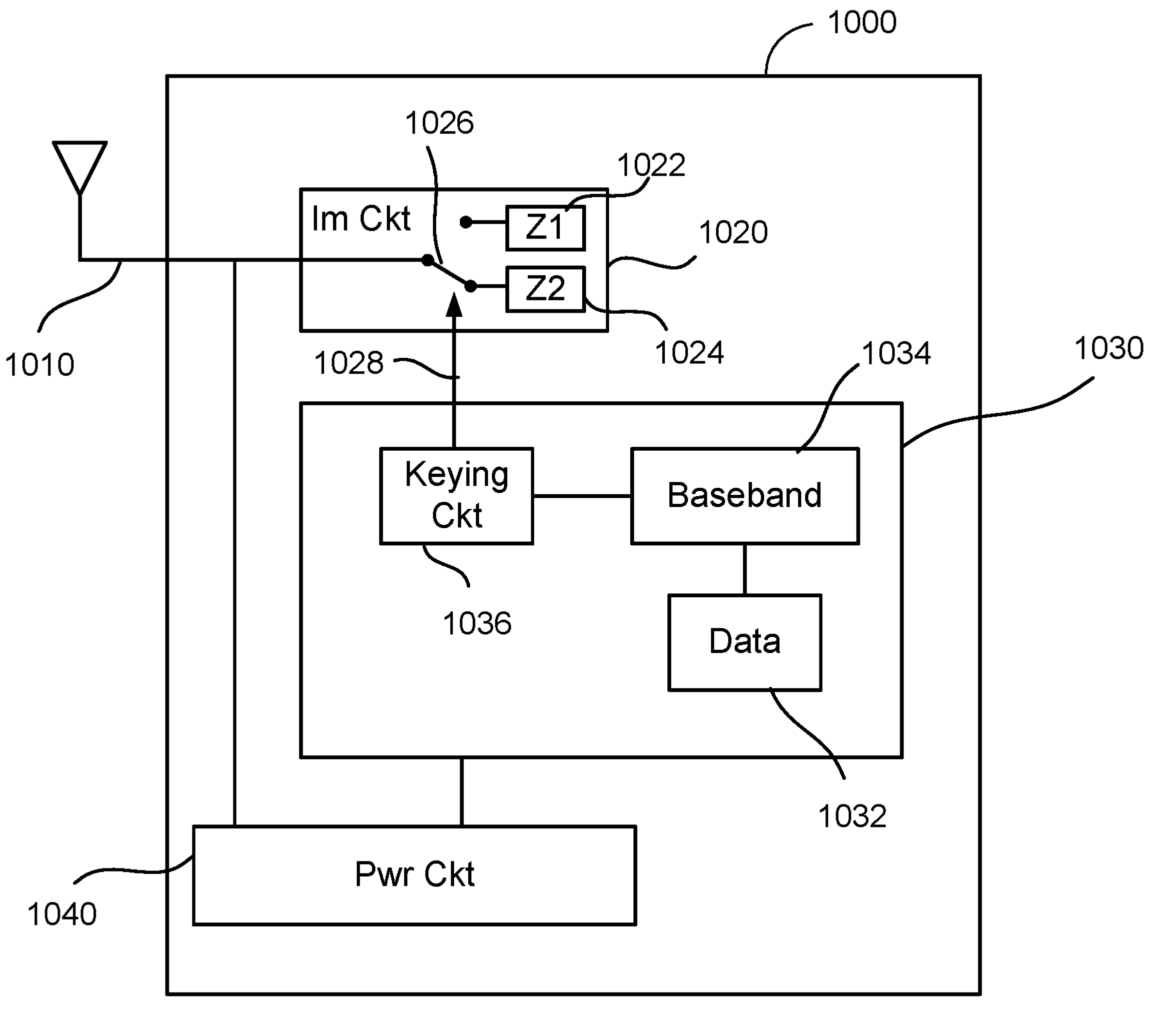
FIG. 10 illustrates a simplified block diagram of a first example communication device, according to aspects of the disclosure.

FIG. 10 illustrates a simplified block diagram of a first example communication device 1000 (e.g., an ambient IoT or an RFID tag), according to aspects of the disclosure. In some aspects, the communication device 1000 may correspond to the RFID tag 530 in FIG. 5. In some aspects, the communication device 1000 include an antenna 1010, antenna impedance adjusting circuitry 1020 (abbreviated as "Im Ckt" in FIG. 10) configured to adjust an impedance of the antenna 1010, a controller 1030 configured to control the antenna impedance adjusting circuitry 1020, and power circuitry 1040 (abbreviated as "Pwr Ckt" in FIG. 10) configured to provide the electrical power to the controller 1030 and the antenna impedance adjusting circuitry 1020. In some aspects, the antenna 1010 and the power circuitry 1040 may correspond to the antenna 532 and the power circuitry 538 in FIG. 5, and detailed description thereof is thus omitted.

In some aspects, the impedance adjusting circuitry 1020 includes a first impedance branch 1022 that is configured to provide a first impedance value Z1, a second impedance branch 1024 that is configured to provide a second impedance value Z2, and a switching circuit 1026 configured to connect the antenna 1010 to the first impedance branch 1022 or the second impedance branch 1024 based on a control signal 1028 from the controller 1030.

In some aspects, the controller 1030 includes data circuitry 1032 (labeled as "Data" in FIG. 10) that stores and/or prepares a response data to be modulated into a backscattered signal. The controller 1030 includes baseband circuitry 1034 configured to generate a baseband data signal that carries the response data. The controller 1030 further includes keying circuitry 1036 (labeled as "Keying Ckt" in FIG. 10) that is configured to combine the baseband data signal from the baseband circuitry 1034 and a keying signal such that the keying signal can be modulated to the control signal 1028. In some aspects, the keying signal may be an intermediate frequency or radio frequency signal and may have a keying frequency (e.g., the shifting frequency fsh in FIG. 9B). In some aspects, the control signal 1028 may correspond to a logical operation (e.g., a logical AND operation) of the baseband data signal and the keying signal.

Figure 11:
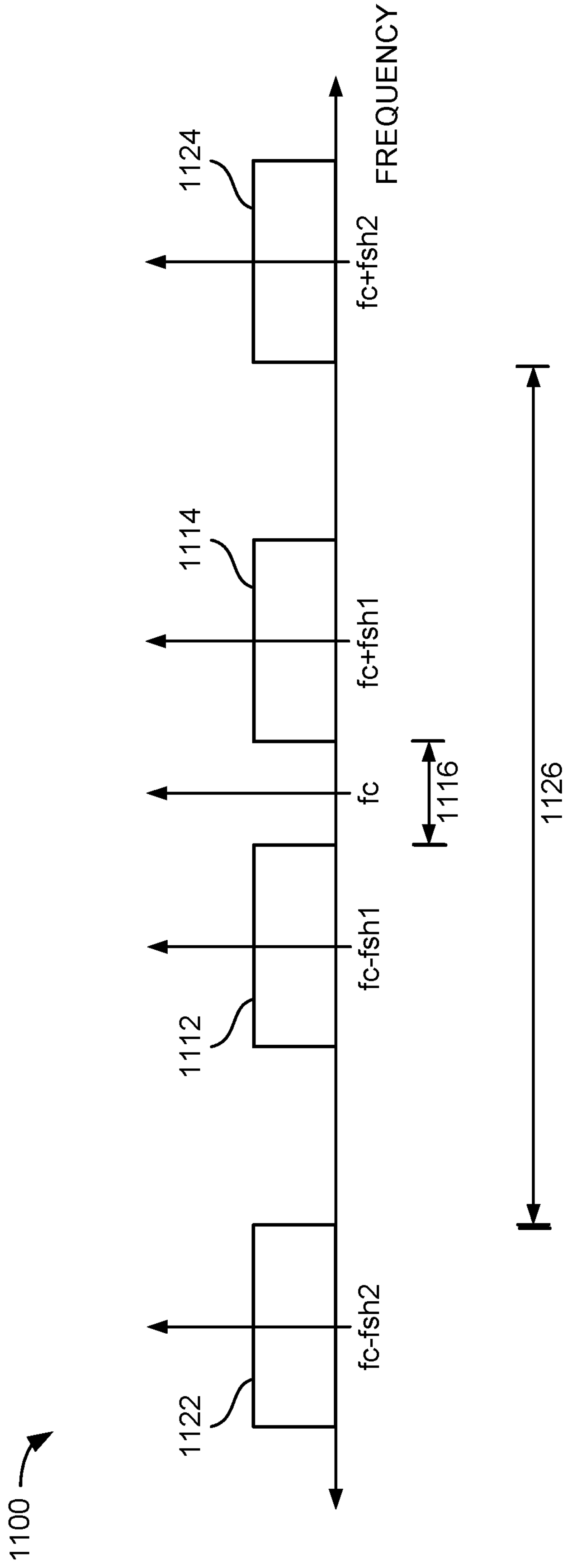
FIG. 11 is a diagram showing an example backscattered signal transmitted by a communication device, according to aspects of the disclosure.

FIG. 11 is a diagram 1100 showing an example backscattered signal transmitted by a communication device (e.g., an ambient IoT device or an RFID tag), according to aspects of the disclosure. The horizontal axis in FIG. 11 represents the frequency. In some aspects, the backscattered signal illustrated in FIG. 11 is based on the reference signal illustrated in FIG. 9A. The elements that are the same or similar to those in FIG. 9A are given the same labels, and detailed description thereof is this omitted.

Compared with the example depicted in FIG. 9B, the communication device may adjust the impedance of the antenna by switching between different impedance values based on one or more keying frequencies, such as based on two keying frequencies labeled as shifting frequencies fsh1 and fsh2 in FIG. 11. As shown in FIG. 11, the backscattered signal is based on four component carriers 1112, 1114, 1122, and 1124. The central frequencies of the backscattered signal may be shifted to fc+fsh1, fc−fsh1, fc+fsh2, and fc−fsh2. The component carrier 1112 has a central frequency of fc−fsh1 and a bandwidth BW; the component carrier 1114 has a central frequency of fc+fsh1 and a bandwidth BW; the component carrier 1122 has a central frequency of fc−fsh2 and a bandwidth BW; and the component carrier 1124 has a central frequency of fc+fsh2 and a bandwidth BW. The switching between different impedance values may generate a pair of DSB components based on the shifting frequencies fsh1 (e.g., component carriers 1112 and 1114) and a pair of DSB components based on the shifting frequencies fsh2 (e.g., component carriers 1122 and 1124). The gap 1116 between the component carrier 1112 and the component carrier 1114 may be determined based on an expression of 2−fsh1−BW; and the gap 1126 between the component carrier 1122 and the component carrier 1124 may be determined based on an expression of 2−fsh2−BW.

Compared with the example depicted in FIG. 9B, the backscattered signal illustrated in FIG. 11 may have a quadrupled bandwidth with respect to the bandwidth of the reference signal.

Figure 12:
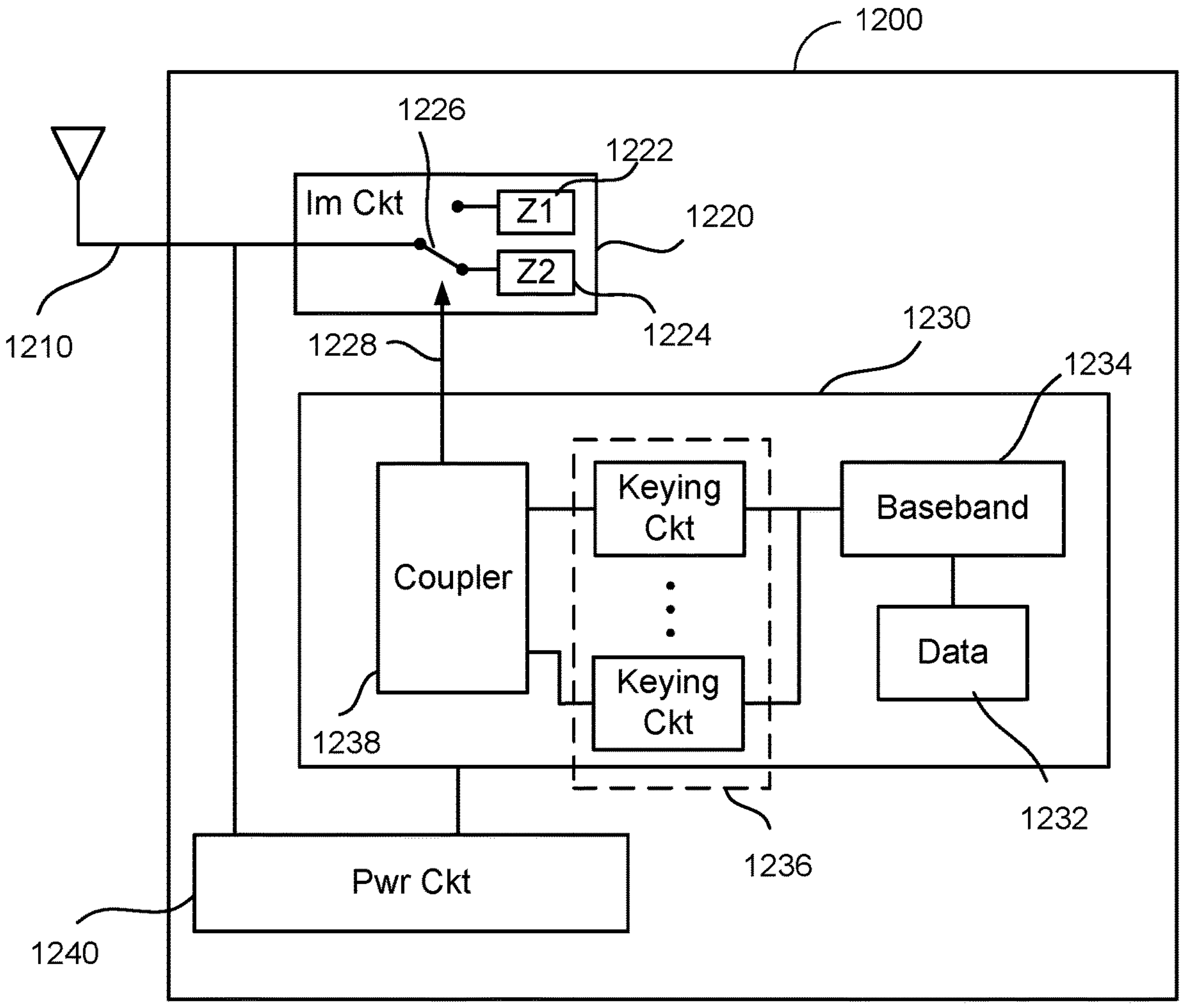
FIG. 12 illustrates a simplified block diagram of a second example communication device, according to aspects of the disclosure.

FIG. 12 illustrates a simplified block diagram of a second example communication device 1200 (e.g., an ambient IoT device or an RFID tag), according to aspects of the disclosure. In some aspects, the communication device 1200 may correspond to the RFID tag 530 in FIG. 5. In some aspects, the communication device 1200 include an antenna 1210, antenna impedance adjusting circuitry 1220 (abbreviated as "Im Ckt" in FIG. 12) configured to adjust an impedance of the antenna 1210, a controller 1230 configured to control the antenna impedance adjusting circuitry 1220, and power circuitry 1240 (abbreviated as "Pwr Ckt" in FIG. 12) configured to provide the electrical power to the controller 1230 and the antenna impedance adjusting circuitry 1220. In some aspects, the antenna 1210 and the power circuitry 1240 may correspond to the antenna 532 and the power circuitry 538 in FIG. 5, and detailed description thereof is thus omitted.

In some aspects, the impedance adjusting circuitry 1220 includes a first impedance branch 1222 that is configured to provide a first impedance value Z1, a second impedance branch 1224 that is configured to provide a second impedance value Z2, and a switching circuit 1226 configured to connect the antenna 1210 to the first impedance branch 1222 or the second impedance branch 1224 based on a control signal 1228 from the controller 1230.

In some aspects, the controller 1230 includes data circuitry 1232 (labeled as "Data" in FIG. 12) that stores and/or prepares a response data to be modulated into a scattered signal. The controller 1230 includes baseband circuitry 1234 configured to generate a baseband data signal that carries the response data. Compared with the controller 1030 in FIG. 10, the controller 1230 includes multiple keying circuitry blocks (each labeled as "Keying Ckt" in FIG. 12 and collectively labeled as 1236) that are configured to combine the baseband data signal from the baseband circuitry 1234 and respective keying signals. The controller 1230 further includes a coupler 1238 that combines the output signals from respective keying circuitry blocks such that the keying signals can be modulated to the control signal 1228.

In some aspects, each one of the keying signal may be an intermediate frequency or radio frequency signal and may have a keying frequency (e.g., the shifting frequencies fsh1 and fsh2 in FIG. 11). In some aspects, each keying circuitry block may output a respective modulated signal based on a logical operation (e.g., a logical AND operation) of the baseband data signal and the corresponding keying signal. In some aspects, the control signal 1228 may correspond to a logical operation (e.g., a logical AND operation) of the modulated signals from the keying circuitry blocks 1236 or a superposition of the modulated signals from the keying circuitry blocks 1236.

In some aspects, the impedance adjusting circuitry 1220 may include more than two impedance branches and corresponding switches. In some aspects, the impedance branches and corresponding switches may be grouped into multiple subsets, and each subset may be controlled by a corresponding control signal from a corresponding keying circuitry block. For example, the impedance adjusting circuitry 1220 may have a first subset of the switches and/or impedance branches controlled by a first control signal generated based on the shifting frequency fsh1, and a second subset of the switches and/or impedance branches controlled by a second control signal generated based on the shifting frequency fsh2.

In operation, a communication station (e.g., a TRP or an RFID station) may transmit a reference signal to a communication device (e.g., the communication device 1000 or the communication device 1200), and the communication device may receive the reference signal from the communication station, where the reference signal may be transmitted based on a reference component carrier frequency (e.g., the component carrier 912 in FIG. 9A). The communication device 1000 or 1200 may generate one or more control signals (such as the control signal 1028 or 1228) based on one or more keying signals that have one or more keying frequencies (e.g., the shifting frequency fsh in FIG. 9B or the shifting frequencies fsh1 and fsh2 in FIG. 11). The communication device 1000 or 1200 may adjust an impedance of the antenna of the communication device based on the one or more control signals to transmit a backscattered signal based on an interaction between the reference signal and the impedance of the antenna. Also, the communication station may receive the backscattered signal from the communication device 1000 or 1200, and then may engage in a positioning procedure based on the backscattered signal.

In some aspects, the resulting backscattered signal may be based on multiple component carriers (e.g., the component carriers 922 and 924 in FIG. 9B or the component carriers 1112, 1114, 1122, and 1124 in FIG. 11) that are based on the reference component carrier frequency shifted by the one or more keying frequencies. In some aspects, the control signal 1028 or 1228 may control the switching circuit 1026 or 1226 in order to perform an DSB frequency shifting operation on the reference signal having one component carrier from the RFID station to transmit a backscattered signal having one or more pairs of component carriers.

In some aspects, during a capability exchange procedure, a location server (e.g., an LMF) may request a target communication device (e.g., an ambient IoT device or an RFID tag) to report its capability to perform carrier aggregation. In some aspects, during a capability exchange procedure, a location server (e.g., an LMF) may request a target communication device to report a number of supported component carriers (e.g., a number of keying circuits, a number of supported keying signals, a number of different clocks, and/or a number of different switches). In some aspects, a target communication device may report to the location server (e.g., an LMF) as assistance information regarding a possible phase incoherence, a possible timing delay, or both, between at least two keying signals. In some aspects, a target communication device may report to the location server (e.g., an LMF) any power degradation in backscattered signal due to enabling carrier aggregation at the communication device, including any power imbalance across different component carriers.

Figure 13:
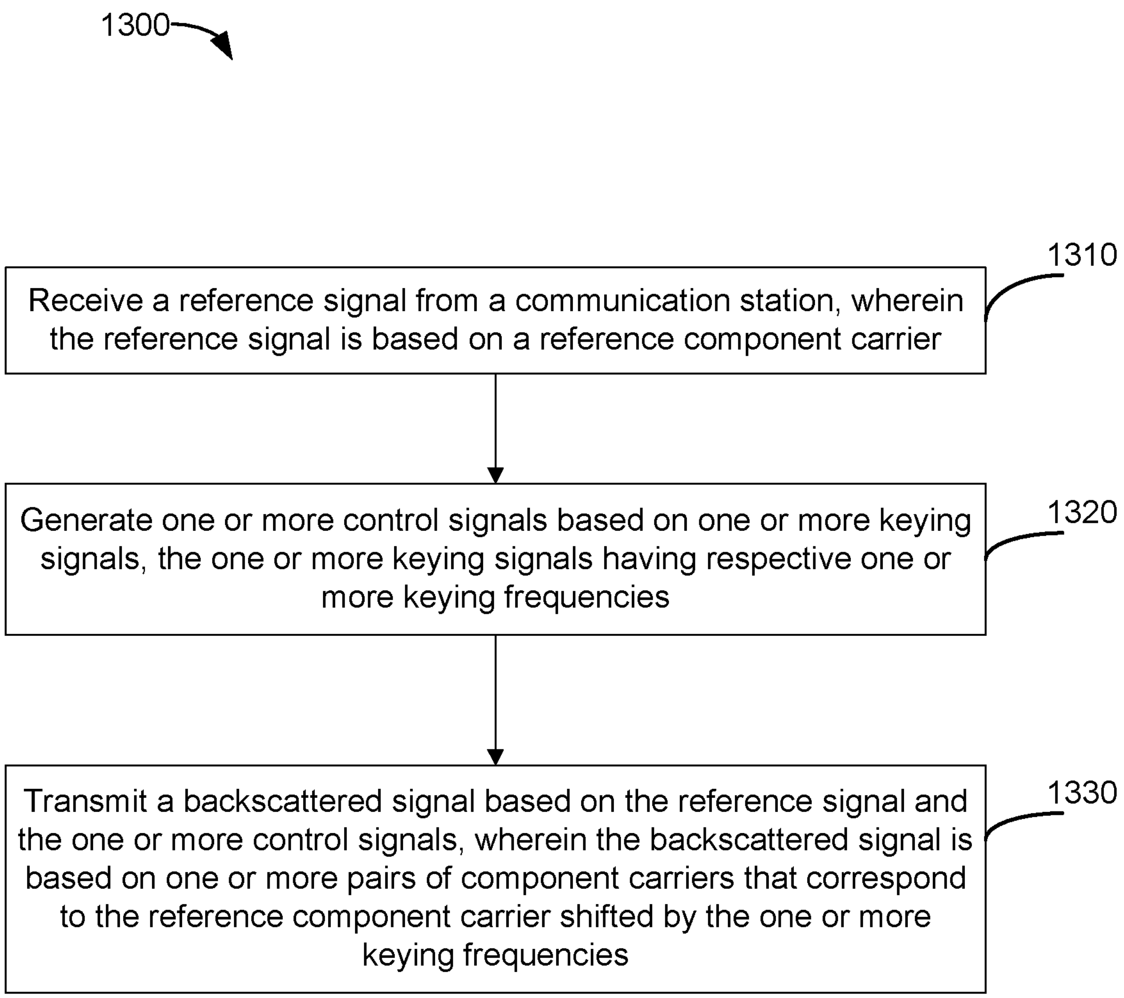
FIG. 13 illustrates an example method of operating a communication, according to aspects of the disclosure.

FIG. 13 illustrates an example method 1300 of operating a communication device, according to aspects of the disclosure. In an aspect, method 1300 may be performed by a communication device that may correspond to any of the RFID tag or ambient IoT device described in this disclosure. In some aspects, the communication device may be a UE having an RFID tag embedded in or integrally formed with the UE, such as any UE described in this disclosure.

At operation 1310, the communication device can receive a reference signal from a communication device (e.g., a TRP or an RFID station), where the reference signal may be based on a reference component carrier (e.g., the component carrier 912 in FIG. 9A). In some aspects, the reference signal may include a PRS, an SL-PRS, or a SRS. In some aspects, operation 1310 may be performed by the RFID tag 530, the communication device 1000, or the communication device 1200. In an aspect, operation 1310 may be performed by the one or more WWAN transceivers 410, the one or more short-range wireless transceivers 420, the one or more processors 432, memory 440, and/or RFID component 442, any or all of which may be considered means for performing this operation.

At operation 1320, the communication device can generate one or more control signals (e.g., the control signal 1028 or the control signal 1228) based on one or more keying signals. In some aspects, the one or more keying signals may have respective one or more keying frequencies (e.g., the shifting frequency fsh in FIG. 9B or the shifting frequencies fsh1 and fsh2 in FIG. 11). In some aspects, operation 1320 may be performed by the RFID tag 530, the communication device 1000, or the communication device 1200. In an aspect, operation 1320 may be performed by the one or more WWAN transceivers 410, the one or more short-range wireless transceivers 420, the one or more processors 432, memory 440, and/or RFID component 442, any or all of which may be considered means for performing this operation.

At operation 1330, the communication device can transmit a backscattered signal based on the reference signal and the one or more control signals. In some aspects, the backscattered signal may be based on one or more pairs of component carriers (e.g., the component carriers 922 and 924 in FIG. 9B or the component carriers 1112, 1114, 1122, and 1124 in FIG. 11) that correspond to the reference component carrier shifted by the one or more keying frequencies (e.g., the shifting frequency fsh in FIG. 9B or the shifting frequencies fsh1 and fsh2 in FIG. 11). In some aspects, the reference component carrier has a bandwidth (e.g., the bandwidth BW in FIG. 9A), and each one of the one or more pairs of component carriers has the bandwidth same as that of the reference component carrier. In some aspects, the communication device can adjust an impedance of an antenna of the communication device based on the one or more control signals to transmit the backscattered signal based on an interaction between the reference signal and the impedance of the antenna.

In some aspects, operation 1330 may be performed by the RFID tag 530, the communication device 1000, or the communication device 1200. In an aspect, operation 1330 may be performed by the one or more WWAN transceivers 410, the one or more short-range wireless transceivers 420, the one or more processors 432, memory 440, and/or RFID component 442, any or all of which may be considered means for performing this operation.

In some aspects, the communication device may receive an inquiry from a location server, and report capability information regarding the one or more keying signals to the location server in response to the inquiry. In some aspects, the capability information may indicate a number of the one or more keying signals supported by the communication device (or indicated as the number of different clocks and/or different switches). In some aspects, the capability information may indicate a phase incoherence, a timing delay, or both, between at least two keying signals of the one or more keying signals. In some aspects, the capability information may indicate an estimated power degradation between the reference signal and the backscattered signal.

In some aspects, the communication device may harvest electrical energy from the reference signal. In some aspects, the electrical energy may power the generation of the one or more control signals and the adjustment of the impedance of the antenna.

As will be appreciated, a technical advantage of the method 1300 is carrier aggregation at an ambient IoT device in order to transmit a backscattered signal based on DSB frequency shifting. Accordingly, less resources for positioning at the transmitter side may be allocated, while the bandwidth of the backscattered signal may be expanded for increased positioning accuracy. Also, implementing carrier aggregation at an ambient IoT device side may result in less power consumption at the transmitter side compared to implementing carrier aggregation at the transmitter side.

Figure 14:
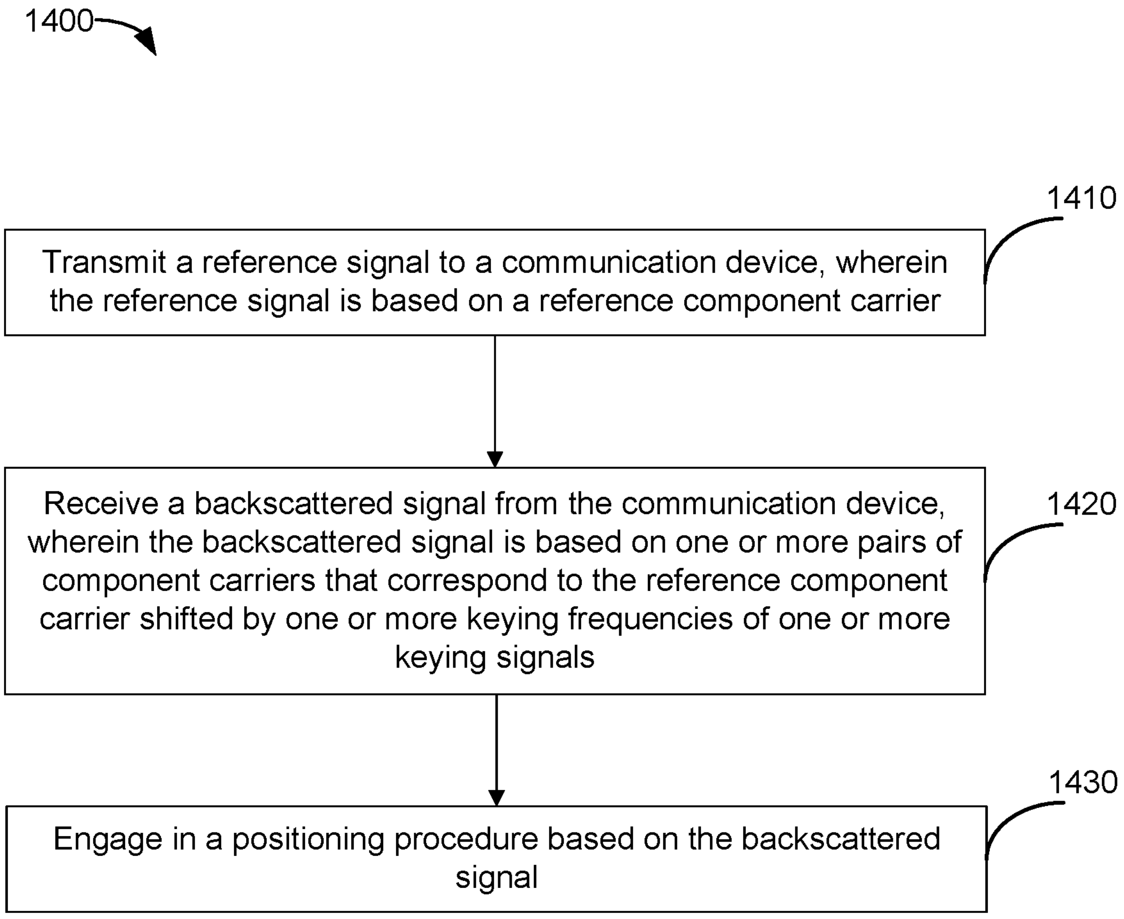
FIG. 14 illustrates an example method of operating a communication station, according to aspects of the disclosure.

FIG. 14 illustrates an example method 1400 of operating a communication station (e.g., a TRP or an RFID station), according to aspects of the disclosure. In an aspect, method 1400 may be performed by a communication station that may correspond to any of the RFID station described in this disclosure. In some aspects, the communication device may be a TRP, such as any TRP described in this disclosure.

At operation 1410, the communication station can transmit a reference signal to a communication device (e.g., an ambient IoT device or an RFID tag), where the reference signal is based on a reference component carrier (e.g., the component carrier 912 in FIG. 9A). In some aspects, the reference signal may include a PRS, an SL-PRS, or a SRS. In an aspect, operation 1410 may be performed by the RFID station 510 or the base station 404. In an aspect, operation 1410 may be performed by the one or more WWAN transceivers 450, the one or more short-range wireless transceivers 460, the one or more processors 484, memory 486, and/or RFID component 488, any or all of which may be considered means for performing this operation.

At operation 1420, the communication station can receive a backscattered signal from the communication device. In some aspects, the backscattered signal is based on one or more pairs of component carriers (e.g., the component carriers 922 and 924 in FIG. 9B or the component carriers 1112, 1114, 1122, and 1124 in FIG. 11) that correspond to the reference component carrier shifted by one or more keying frequencies of one or more keying signals (e.g., the shifting frequency fsh in FIG. 9B or the shifting frequencies fsh1 and fsh2 in FIG. 11). In some aspects, the reference component carrier has a bandwidth (e.g., the bandwidth BW in FIG. 9A), and each one of the multiple component carriers has the bandwidth same as that of the reference component carrier. In some aspects, the backscattered signal may be transmitted based on an interaction between the reference signal and an impedance of an antenna of the communication device. In some aspects, the impedance of the antenna of the communication device may be adjusted based on the one or more keying signals.

In an aspect, operation 1420 may be performed by the RFID station 510 or the base station 404. In an aspect, operation 1420 may be performed by the one or more WWAN transceivers 450, the one or more short-range wireless transceivers 460, the one or more processors 484, memory 486, and/or RFID component 488, any or all of which may be considered means for performing this operation.

At operation 1430, the communication station can engage in a positioning procedure based on the backscattered signal. In an aspect, operation 1430 may be performed by the RFID station 510, the base station 404, or by the RFID station or the base station 404 working with a location server. In an aspect, operation 1430 may be performed by the one or more WWAN transceivers 450, the one or more short-range wireless transceivers 460, the one or more processors 484, memory 486, and/or RFID component 488, any or all of which may be considered means for performing this operation.

In some aspects, the communication station may receive from a location server capability information regarding the one or more keying signals supported by the communication device. In some aspects, the capability information may indicate a number of the one or more keying signals supported by the communication device (or indicated as the number of different clocks and/or different switches). In some aspects, the capability information may indicate a phase incoherence, a timing delay, or both, between at least two keying signals of the one or more keying signals. In some aspects, the capability information may indicate an estimated power degradation between the reference signal and the backscattered signal.

As will be appreciated, a technical advantage of the method 1400 is carrier aggregation at an ambient IoT device in order to transmit a backscattered signal based on DSB frequency shifting. Accordingly, less resources for positioning at the transmitter side (e.g., the communication station) may be allocated, while the bandwidth of the backscattered signal may be expanded for increased positioning accuracy. Also, implementing carrier aggregation at an ambient IoT device side may result in less power consumption at the transmitter side compared to implementing carrier aggregation at the transmitter side.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a communication device, the method comprising: receiving a reference signal from a communication station, wherein the reference signal is based on a reference component carrier; generating one or more control signals based on one or more keying signals, the one or more keying signals having respective one or more keying frequencies; and transmitting a backscattered signal based on the reference signal and the one or more control signals, wherein the backscattered signal is based on one or more pairs of component carriers that correspond to the reference component carrier shifted by the one or more keying frequencies.

Clause 2. The method of clause 1, wherein the transmitting the backscattered signal comprises adjusting an impedance of an antenna of the communication device based on the one or more control signals such that the backscattered signal is transmitted based on an interaction between the reference signal and the impedance of the antenna.

Clause 3. The method of any of clauses 1 to 2, wherein the reference signal comprises a positioning reference signal (PRS), a sidelink positioning reference signal (SL-PRS), or a sounding reference signal (SRS).

Clause 4. The method of any of clauses 1 to 3, wherein: each component carrier of the one or more pairs of component carriers has the same bandwidth as that of the reference component carrier.

Clause 5. The method of any of clauses 1 to 4, further comprising: receiving an inquiry from a location server; and reporting capability information regarding the one or more keying signals to the location server in response to the inquiry.

Clause 6. The method of clause 5, wherein: the capability information indicates a number of the one or more keying signals supported by the communication device.

Clause 7. The method of any of clauses 5 to 6, wherein: the capability information indicates a phase incoherence, a timing delay, or both, between at least two keying signals of the one or more keying signals.

Clause 8. The method of any of clauses 5 to 7, wherein: the capability information indicates an estimated power degradation between the reference signal and the backscattered signal.

Clause 9. A method of operating a communication station, the method comprising: transmitting a reference signal to a communication device, wherein the reference signal is based on a reference component carrier; receiving a backscattered signal from the communication device, wherein the backscattered signal is based on one or more pairs of component carriers that correspond to the reference component carrier shifted by one or more keying frequencies of one or more keying signals; and engaging in a positioning procedure based on the backscattered signal.

Clause 10. The method of clause 9, wherein the backscattered signal is transmitted based on an interaction between the reference signal and an impedance of an antenna of the communication device.

Clause 11. The method of any of clauses 9 to 10, wherein the reference signal comprises a positioning reference signal (PRS), a sidelink positioning reference signal (SL-PRS), or a sounding reference signal (SRS).

Clause 12. The method of any of clauses 9 to 11, wherein: each component carrier of the one or more pairs of component carriers has the same bandwidth as that of the reference component carrier.

Clause 13. The method of any of clauses 9 to 12, further comprising: receiving from a location server reporting capability information regarding the one or more keying signals supported by the communication device.

Clause 14. The method of clause 13, wherein: the capability information indicates a number of the one or more keying signals supported by the communication device.

Clause 15. The method of any of clauses 13 to 14, wherein: the capability information indicates a phase incoherence, a timing delay, or both, between at least two keying signals of the one or more keying signals.

Clause 16. The method of any of clauses 13 to 15, wherein: the capability information indicates an estimated power degradation between the reference signal and the backscattered signal.

Clause 17. A communication device, comprising: one or more memories; one or more transceivers; and one or more processors communicatively coupled to the one or more memories and the one or more transceivers, the one or more processors, either alone or in combination, configured to: receive, via the one or more transceivers, a reference signal from a communication station, wherein the reference signal is based on a reference component carrier; generate one or more control signals based on one or more keying signals, the one or more keying signals having respective one or more keying frequencies; and transmit, via the one or more transceivers, a backscattered signal based on the reference signal and the one or more control signals, wherein the backscattered signal is based on one or more pairs of component carriers that correspond to the reference component carrier shifted by the one or more keying frequencies.

Clause 18. The communication device of clause 17, wherein the one or more processors, either alone or in combination, configured to transmit the backscattered signal are further configured to adjust an impedance of an antenna of the communication device based on the one or more control signals such that the backscattered signal is transmitted based on an interaction between the reference signal and the impedance of the antenna.

Clause 19. The communication device of any of clauses 17 to 18, wherein the reference signal comprises a positioning reference signal (PRS), a sidelink positioning reference signal (SL-PRS), or a sounding reference signal (SRS).

Clause 20. The communication device of any of clauses 17 to 19, wherein: each component carrier of the one or more pairs of component carriers has the same bandwidth as that of the reference component carrier.

Clause 21. The communication device of any of clauses 17 to 20, wherein the one or more processors, either alone or in combination, are further configured to: receive, via the one or more transceivers, an inquiry from a location server; and report, via the one or more transceivers, capability information regarding the one or more keying signals to the location server in response to the inquiry.

Clause 22. The communication device of clause 21, wherein: the capability information indicates a number of the one or more keying signals supported by the communication device.

Clause 23. The communication device of any of clauses 21 to 22, wherein: the capability information indicates a phase incoherence, a timing delay, or both, between at least two keying signals of the one or more keying signals.

Clause 24. The communication device of any of clauses 21 to 23, wherein: the capability information indicates an estimated power degradation between the reference signal and the backscattered signal.

Clause 25. A communication station, comprising: one or more memories; one or more transceivers; and one or more processors communicatively coupled to the one or more memories and the one or more transceivers, the one or more processors, either alone or in combination, configured to: transmit, via the one or more transceivers, a reference signal to a communication device, wherein the reference signal is based on a reference component carrier; receive, via the one or more transceivers, a backscattered signal from the communication device, wherein the backscattered signal is based on one or more pairs of component carriers that correspond to the reference component carrier shifted by one or more keying frequencies of one or more keying signals; and engage in a positioning procedure based on the backscattered signal.

Clause 26. The communication station of clause 25, wherein the backscattered signal is transmitted based on an interaction between the reference signal and an impedance of an antenna of the communication device.

Clause 27. The communication station of any of clauses 25 to 26, wherein the reference signal comprises a positioning reference signal (PRS), a sidelink positioning reference signal (SL-PRS), or a sounding reference signal (SRS).

Clause 28. The communication station of any of clauses 25 to 27, wherein: each component carrier of the one or more pairs of component carriers has the same bandwidth as that of the reference component carrier.

Clause 29. The communication station of any of clauses 25 to 28, wherein the one or more processors, either alone or in combination, are further configured to: receive, via the one or more transceivers, from a location server reporting capability information regarding the one or more keying signals supported by the communication device.

Clause 30. The communication station of clause 29, wherein: the capability information indicates a number of the one or more keying signals supported by the communication device.

Clause 31. The communication station of any of clauses 29 to 30, wherein: the capability information indicates a phase incoherence, a timing delay, or both, between at least two keying signals of the one or more keying signals.

Clause 32. The communication station of any of clauses 29 to 31, wherein: the capability information indicates an estimated power degradation between the reference signal and the backscattered signal.

Clause 33. A communication device, comprising: means for receiving a reference signal from a communication station, wherein the reference signal is based on a reference component carrier; means for generating one or more control signals based on one or more keying signals, the one or more keying signals having respective one or more keying frequencies; and means for transmitting a backscattered signal based on the reference signal and the one or more control signals, wherein the backscattered signal is based on one or more pairs of component carriers that correspond to the reference component carrier shifted by the one or more keying frequencies.

Clause 34. The communication device of clause 33, wherein the means for transmitting the backscattered signal comprises means for adjusting an impedance of an antenna of the communication device based on the one or more control signals such that the backscattered signal is transmitted based on an interaction between the reference signal and the impedance of the antenna.

Clause 35. The communication device of any of clauses 33 to 34, wherein the reference signal comprises a positioning reference signal (PRS), a sidelink positioning reference signal (SL-PRS), or a sounding reference signal (SRS).

Clause 36. The communication device of any of clauses 33 to 35, wherein: each component carrier of the one or more pairs of component carriers has the same bandwidth as that of the reference component carrier.

Clause 37. The communication device of any of clauses 33 to 36, further comprising: means for receiving an inquiry from a location server; and means for reporting capability information regarding the one or more keying signals to the location server in response to the inquiry.

Clause 38. The communication device of clause 37, wherein: the capability information indicates a number of the one or more keying signals supported by the communication device.

Clause 39. The communication device of any of clauses 37 to 38, wherein: the capability information indicates a phase incoherence, a timing delay, or both, between at least two keying signals of the one or more keying signals.

Clause 40. The communication device of any of clauses 37 to 39, wherein: the capability information indicates an estimated power degradation between the reference signal and the backscattered signal.

Clause 41. A communication station, comprising: means for transmitting a reference signal to a communication device, wherein the reference signal is based on a reference component carrier; means for receiving a backscattered signal from the communication device, wherein the backscattered signal is based on one or more pairs of component carriers that correspond to the reference component carrier shifted by one or more keying frequencies of one or more keying signals; and means for engaging in a positioning procedure based on the backscattered signal.

Clause 42. The communication station of clause 41, wherein the backscattered signal is transmitted based on an interaction between the reference signal and an impedance of an antenna of the communication device.

Clause 43. The communication station of any of clauses 41 to 42, wherein the reference signal comprises a positioning reference signal (PRS), a sidelink positioning reference signal (SL-PRS), or a sounding reference signal (SRS).

Clause 44. The communication station of any of clauses 41 to 43, wherein: each component carrier of the one or more pairs of component carriers has the same bandwidth as that of the reference component carrier.

Clause 45. The communication station of any of clauses 41 to 44, further comprising: means for receiving from a location server reporting capability information regarding the one or more keying signals supported by the communication device.

Clause 46. The communication station of clause 45, wherein: the capability information indicates a number of the one or more keying signals supported by the communication device.

Clause 47. The communication station of any of clauses 45 to 46, wherein: the capability information indicates a phase incoherence, a timing delay, or both, between at least two keying signals of the one or more keying signals.

Clause 48. The communication station of any of clauses 45 to 47, wherein: the capability information indicates an estimated power degradation between the reference signal and the backscattered signal.

Clause 49. A non-transitory computer-readable medium storing computer-executable instructions that, when executed by a communication device, cause the communication device to: receive a reference signal from a communication station, wherein the reference signal is based on a reference component carrier; generate one or more control signals based on one or more keying signals, the one or more keying signals having respective one or more keying frequencies; and transmit a backscattered signal based on the reference signal and the one or more control signals, wherein the backscattered signal is based on one or more pairs of component carriers that correspond to the reference component carrier shifted by the one or more keying frequencies.

Clause 50. The non-transitory computer-readable medium of clause 49, wherein the computer-executable instructions that, when executed by the communication device, cause the communication device to transmit the backscattered signal further comprises computer-executable instructions that, when executed by the communication device, cause the communication device to adjust an impedance of an antenna of the communication device based on the one or more control signals such that the backscattered signal is transmitted based on an interaction between the reference signal and the impedance of the antenna.

Clause 51. The non-transitory computer-readable medium of any of clauses 49 to 50, wherein the reference signal comprises a positioning reference signal (PRS), a sidelink positioning reference signal (SL-PRS), or a sounding reference signal (SRS).

Clause 52. The non-transitory computer-readable medium of any of clauses 49 to 51, wherein: each component carrier of the one or more pairs of component carriers has the same bandwidth as that of the reference component carrier.

Clause 53. The non-transitory computer-readable medium of any of clauses 49 to 52, further comprising computer-executable instructions that, when executed by the communication device, cause the communication device to: receive an inquiry from a location server; and report capability information regarding the one or more keying signals to the location server in response to the inquiry.

Clause 54. The non-transitory computer-readable medium of clause 53, wherein: the capability information indicates a number of the one or more keying signals supported by the communication device.

Clause 55. The non-transitory computer-readable medium of any of clauses 53 to 54, wherein: the capability information indicates a phase incoherence, a timing delay, or both, between at least two keying signals of the one or more keying signals.

Clause 56. The non-transitory computer-readable medium of any of clauses 53 to 55, wherein: the capability information indicates an estimated power degradation between the reference signal and the backscattered signal.

Clause 57. A non-transitory computer-readable medium storing computer-executable instructions that, when executed by a communication station, cause the communication station to: transmit a reference signal to a communication device, wherein the reference signal is based on a reference component carrier; receive a backscattered signal from the communication device, wherein the backscattered signal is based on one or more pairs of component carriers that correspond to the reference component carrier shifted by one or more keying frequencies of one or more keying signals; and engage in a positioning procedure based on the backscattered signal.

Clause 58. The non-transitory computer-readable medium of clause 57, wherein the backscattered signal is transmitted based on an interaction between the reference signal and an impedance of an antenna of the communication device.

Clause 59. The non-transitory computer-readable medium of any of clauses 57 to 58, wherein the reference signal comprises a positioning reference signal (PRS), a sidelink positioning reference signal (SL-PRS), or a sounding reference signal (SRS).

Clause 60. The non-transitory computer-readable medium of any of clauses 57 to 59, wherein: each component carrier of the one or more pairs of component carriers has the same bandwidth as that of the reference component carrier.

Clause 61. The non-transitory computer-readable medium of any of clauses 57 to 60, further comprising computer-executable instructions that, when executed by the communication station, cause the communication station to: receive from a location server reporting capability information regarding the one or more keying signals supported by the communication device.

Clause 62. The non-transitory computer-readable medium of clause 61, wherein: the capability information indicates a number of the one or more keying signals supported by the communication device.

Clause 63. The non-transitory computer-readable medium of any of clauses 61 to 62, wherein: the capability information indicates a phase incoherence, a timing delay, or both, between at least two keying signals of the one or more keying signals.

Clause 64. The non-transitory computer-readable medium of any of clauses 61 to 63, wherein: the capability information indicates an estimated power degradation between the reference signal and the backscattered signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of operating a communication device, the method comprising:

receiving a reference signal from a communication station, wherein the reference signal is based on a reference component carrier;

generating one or more control signals based on one or more keying signals, the one or more keying signals having respective one or more keying frequencies; and transmitting a backscattered signal based on the reference signal and the one or more control signals, wherein the backscattered signal is based on one or more pairs of component carriers comprising at least a first component carrier and a second component carrier that correspond to the reference component carrier, wherein the first component carrier and the second component carrier are each shifted within a same frequency band in accordance with the respective one or more keying frequencies.

2. The method of claim 1, wherein the transmitting the backscattered signal comprises adjusting an impedance of an antenna of the communication device based on the one or more control signals such that the backscattered signal is transmitted based on an interaction between the reference signal and the impedance of the antenna.

3. The method of claim 1, wherein the reference signal comprises a positioning reference signal (PRS), a sidelink positioning reference signal (SL-PRS), or a sounding reference signal (SRS).

4. The method of claim 1, wherein:

each component carrier of the one or more pairs of component carriers has a same bandwidth as that of the reference component carrier.

5. The method of claim 1, further comprising:

receiving an inquiry from a location server; and reporting capability information regarding the one or more keying signals to the location server in response to the inquiry.

6. The method of claim 5, wherein:

the capability information indicates a number of the one or more keying signals supported by the communication device.

7. The method of claim 5, wherein:

the capability information indicates a phase incoherence, a timing delay, or both, between at least two keying signals of the one or more keying signals.

8. The method of claim 5, wherein:

the capability information indicates an estimated power degradation between the reference signal and the backscattered signal.

9. A method of operating a communication station, the method comprising:

transmitting a reference signal to a communication device, wherein the reference signal is based on a reference component carrier;

receiving a backscattered signal from the communication device, wherein the backscattered signal is based on one or more pairs of component carriers comprising a first component carrier and a second component carrier that correspond to the reference component carrier, wherein the first component carrier and the second component carrier are each shifted by within a same frequency band in accordance with one or more keying frequencies of one or more keying signals; and engaging in a positioning procedure based on the backscattered signal.

10. The method of claim 9, wherein the backscattered signal is transmitted based on an interaction between the reference signal and an impedance of an antenna of the communication device.

11. The method of claim 9, wherein the reference signal comprises a positioning reference signal (PRS), a sidelink positioning reference signal (SL-PRS), or a sounding reference signal (SRS).

12. The method of claim 9, wherein:

each component carrier of the one or more pairs of component carriers has a same bandwidth as that of the reference component carrier.

13. The method of claim 9, further comprising:

receiving from a location server capability information regarding the one or more keying signals supported by the communication device.

14. The method of claim 13, wherein:

the capability information indicates a number of the one or more keying signals supported by the communication device.

15. The method of claim 13, wherein:

the capability information indicates a phase incoherence, a timing delay, or both, between at least two keying signals of the one or more keying signals.

16. The method of claim 13, wherein:

the capability information indicates an estimated power degradation between the reference signal and the backscattered signal.

17. A communication device, comprising:

one or more memories;

one or more transceivers; and one or more processors communicatively coupled to the one or more memories and the one or more transceivers, the one or more processors, either alone or in combination, configured to:

receive, via the one or more transceivers, a reference signal from a communication station, wherein the reference signal is based on a reference component carrier;

generate one or more control signals based on one or more keying signals, the one or more keying signals having respective one or more keying frequencies; and transmit, via the one or more transceivers, a backscattered signal based on the reference signal and the one or more control signals, wherein the backscattered signal is based on one or more pairs of component carriers comprising a first component carrier and a second component carrier that correspond to the reference component carrier, wherein the first component carrier and the second component carrier are each shifted within a same frequency band in accordance with the respective one or more keying frequencies.

18. The communication device of claim 17, wherein the one or more processors, either alone or in combination, configured to transmit the backscattered signal are further configured to adjust an impedance of an antenna of the communication device based on the one or more control signals such that the backscattered signal is transmitted based on an interaction between the reference signal and the impedance of the antenna.

19. The communication device of claim 17, wherein the reference signal comprises a positioning reference signal (PRS), a sidelink positioning reference signal (SL-PRS), or a sounding reference signal (SRS).

20. The communication device of claim 17, wherein the one or more processors, either alone or in combination, are further configured to:

receive, via the one or more transceivers, an inquiry from a location server; and report, via the one or more transceivers, capability information regarding the one or more keying signals to the location server in response to the inquiry.

21. The communication device of claim 20, wherein:

the capability information indicates a number of the one or more keying signals supported by the communication device.

22. The communication device of claim 20, wherein:

the capability information indicates a phase incoherence, a timing delay, or both, between at least two keying signals of the one or more keying signals.

23. The communication device of claim 20, wherein:

the capability information indicates an estimated power degradation between the reference signal and the backscattered signal.

24. A communication station, comprising:

one or more memories;

one or more transceivers; and one or more processors communicatively coupled to the one or more memories and the one or more transceivers, the one or more processors, either alone or in combination, configured to:

transmit, via the one or more transceivers, a reference signal to a communication device, wherein the reference signal is based on a reference component carrier;

receive, via the one or more transceivers, a backscattered signal from the communication device, wherein the backscattered signal is based on one or more pairs of component carriers comprising a first component carrier and a second component carrier that correspond to the reference component carrier, wherein the first component carrier and the second component carrier are each shifted within a same frequency band in accordance with one or more keying frequencies of one or more keying signals; and engage in a positioning procedure based on the backscattered signal.

25. The communication station of claim 24, wherein the backscattered signal is transmitted based on an interaction between the reference signal and an impedance of an antenna of the communication device.

26. The communication station of claim 24, wherein the reference signal comprises a positioning reference signal (PRS), a sidelink positioning reference signal (SL-PRS), or a sounding reference signal (SRS).

27. The communication station of claim 24, wherein the one or more processors, either alone or in combination, are further configured to:

receive, via the one or more transceivers, from a location server reporting capability information regarding the one or more keying signals supported by the communication device.

28. The communication station of claim 27, wherein:

the capability information indicates a number of the one or more keying signals supported by the communication device.

29. The communication station of claim 27, wherein:

the capability information indicates a phase incoherence, a timing delay, or both, between at least two keying signals of the one or more keying signals.

30. The communication station of claim 27, wherein:

the capability information indicates an estimated power degradation between the reference signal and the backscattered signal.

* * * * *